(12) United States Patent
Ouchi

(10) Patent No.: US 7,184,021 B2
(45) Date of Patent: Feb. 27, 2007

(54) GAME PERFORMING METHOD, STORAGE MEDIUM, GAME APPARATUS, DATA SIGNAL AND PROGRAM

(75) Inventor: Satoru Ouchi, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 280 days.

(21) Appl. No.: 10/611,262

(22) Filed: Jul. 2, 2003

(65) Prior Publication Data
US 2004/0058730 A1    Mar. 25, 2004

(30) Foreign Application Priority Data
Jul. 2, 2002    (JP)    ............... 2002-193653

(51) Int. Cl.
*G09G 5/08*    (2006.01)
(52) U.S. Cl. ............ 345/161; 345/157; 345/162; 463/38
(58) Field of Classification Search ........ 345/156–167; 463/38
See application file for complete search history.

(56) References Cited

U.S. PATENT DOCUMENTS 4,500,867 A * 2/1985 Ishitobi et al. .............. 338/128
6,121,955 A * 9/2000 Liu ............................ 345/161
6,208,328 B1 * 3/2001 Kawachiya et al. ........ 345/157
6,257,983 B1 * 7/2001 Rimoto ....................... 463/38
6,769,988 B1 * 8/2004 Sato et al. ................... 463/38

FOREIGN PATENT DOCUMENTS

JP    A-2001-259219    9/2001

* cited by examiner

Primary Examiner—Amr A. Awad
Assistant Examiner—Sameer Gokhale
(74) Attorney, Agent, or Firm—Oliff & Berridge, PLC

(57) ABSTRACT

A game performing method realizable of finer and easier operational input with a joy stick. The game performing method for an apparatus comprising an input section having an operating handle capable of inputting an inclination of a desired angle in a desired direction, has: controlling a virtual handle of a player character according to operation inputted through the operating handle; detecting an inclined direction and an inclined angle of the operating handle; and changing a handle angle of the virtual handle in a direction according to change in the inclined direction when the change in the inclined direction is detected by detecting the inclined direction and the inclined angle of the operating handle.

19 Claims, 16 Drawing Sheets

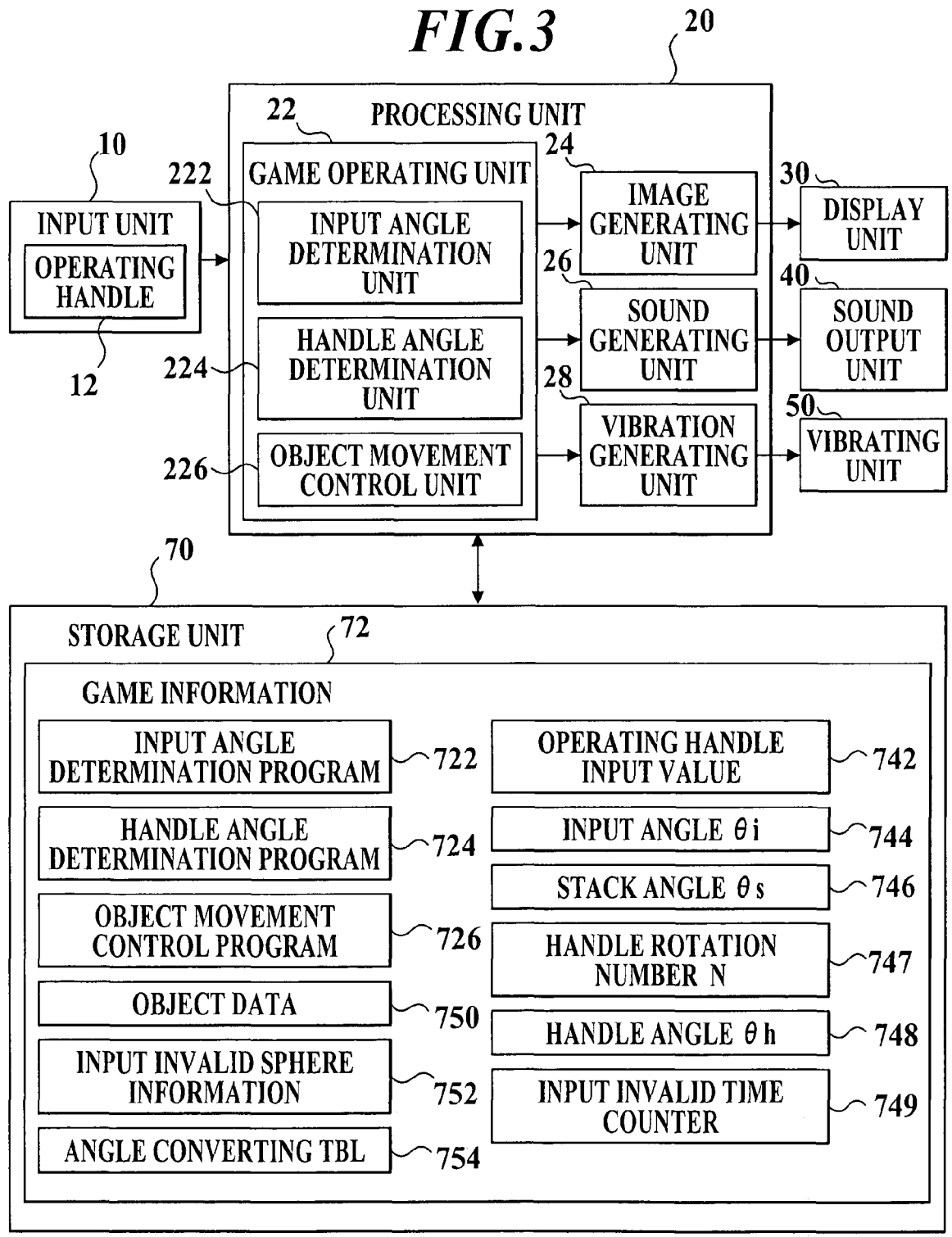

FIG.4A
754
| INPUT ANGLE SPHERE 754a | STACK ANGLE SPHERE 754b | HANDLE ROTATION NUMBER VARIABLE VALUE 754c |
|---|---|---|
| $0 \leq \theta i \leq 90$ | $0 < \theta s < 180$ | 0 |
|  | $-180 < \theta s < 0$ |  |
| $90 < \theta i < 180$ | $0 < \theta s < 180$ | 0 |
|  | $-180 < \theta s < 0$ | -1 |
| $-90 \leq \theta i < 0$ | $0 < \theta s < 180$ | 0 |
|  | $-180 < \theta s < 0$ |  |
| $-180 < \theta i < -90$ | $0 < \theta s < 180$ | 1 |
|  | $-180 < \theta s < 0$ | 0 |
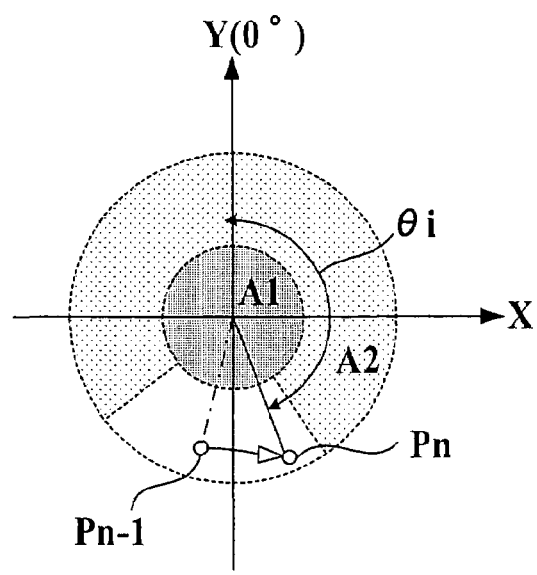
FIG.4B
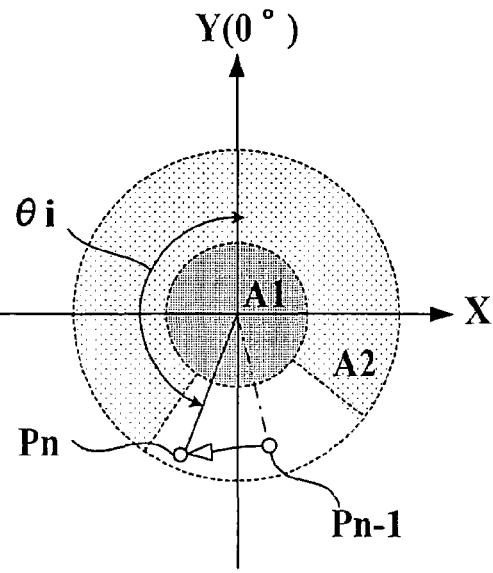
FIG.4C

752

| IDENTIFICATION NUMBER (752a) | SPHERE INFORMATION (752b) | DETERMINATION APPLICABLE FLAG (752c) | INVALID NUMBER (752d) |
|---|---|---|---|
| A0 | SPHERE-A0 | 1 | 0 |
| F1 | SPHERE-F1 | 1 | 0 |
| F2 | SPHERE-F2 | 1 | 0 |
| F3 | SPHERE-F3 | 1 | 0 |
| F4 | SPHERE-F4 | 0 | 1 |
| F5 | SPHERE-F5 | 0 | 3 |
| ⋮ | ⋮ | ⋮ | ⋮ |
| F23 | SPHERE-F23 | 1 | 0 |
| F24 | SPHERE-F24 | 1 | 0 |

GAME PERFORMING METHOD, STORAGE MEDIUM, GAME APPARATUS, DATA SIGNAL AND PROGRAM

BACKGROUND OF THE INVENTION

1. Field of the Invention

The present invention relates to a game performing method and the like for making an apparatus similar to a computer comprising an input section having an operating handle capable of inputting an inclination of an arbitrary angle in an arbitrary direction perform a predetermined game.

2. Description of Related Art

Many game controllers to be equipped by recent consumer game apparatuses are normally provided with joy sticks. The joy stick is a kind of pointing devices having an operating handle capable of inputting inclinations in the front, rear, right and left directions arbitrarily, and the joy stick can input analog numerical values according to degrees of the inclinations of the operating handle.

The joy sticks mounted on consumer game apparatuses can input numerical values within a scope, for example, from 0 to 300 in each of the front, rear, right and left directions. The consumer game apparatuses can calculate and use inclined directions and inclined angles on the basis of the inputted numerical values.

By using the joy stick, rapid fine or smoothly continuous input operations which can hardly be realized by intermittent on and off input by using a button switch, can be realized. Thereby, a player can obtain high operationality and realistic sensations in a real time type game such as a flight simulation game, a car race game, an action game or the like.

However, many of the joy sticks mounted on the consumer game apparatuses are designed to have a short stroke capable of being operated with a finger. Consequently, for example, when handle operation of a race car is performed with the joy stick by inclining the joy stick to the right and left direction, there occurs a problem that it is required to handle the joy stick very quickly (that is, the handle of the race car is turned largely by operating the joy stick a little) because the stroke of the joy stick is short and therefore it becomes difficult to operate the joy stick, though smooth steering operations can be realized by the joy stick in comparison with button switches.

SUMMARY OF THE INVENTION

The present invention was developed in view of the above-described problem.

It is an object of the present invention to realize finer and easier operational input with a joy stick.

In accordance with a first aspect of the present invention, a game performing method for an apparatus comprising an input section having an operating handle capable of inputting an inclination of a desired angle in a desired direction, comprises: controlling a virtual handle of a player character according to operation inputted through the operating handle; detecting an inclined direction and an inclined angle of the operating handle; and changing a handle angle of the virtual handle in a direction according to change in the inclined direction when the change in the inclined direction is detected by detecting the inclined direction and the inclined angle of the operating handle.

In accordance with a second aspect of the present invention, a game apparatus comprises: an input section having an operating handle capable of inputting an inclination of a desired angle in a desired direction; a control section for controlling a virtual handle of a player character according to operation inputted through the operating handle; a detecting section for detecting an inclined direction and an inclined angle of the operating handle; and a changing section for changing a handle angle of the virtual handle in a direction according to change in the inclined direction when the change in the inclined direction is detected as a result of the inclined direction and the inclined angle of the operating handle detected by the detecting section.

The player character means a character operated by a player when the player plays a game. For example, in case of a car race game, a race car taking part in a race corresponds to the player character, or in case of a shooting game, a fighter plane or an artillery corresponds to the player character. The virtual handle means a device operated by the player character in the game. For example, in case the player character is the race car, an driving handle corresponds to the virtual handle.

According to the method of the first aspect or the apparatus of the second aspect of the present invention, when the operating handle is inclined and rotated, the change in the inclined direction of the operating handle is changed and the virtual handle is rotated in the direction in which the operating handle is rotated. Consequently, it is possible to operate the player character by inclining and operating the operating handle so as to rotate the operating handle. In comparison with an earlier development of simply inclining the operating handle linearly in front and rear directions or in right and left directions, it is possible to gain strokes of operation and input finer operation by the operating handle. Further, because movement for rotating the operating handle is connected to movement for rotating the virtual handle sensuously, it is possible to enhance sensory perception of the game more.

Preferably, the game performing method of the first aspect of the present invention, further comprises: determining a changeable amount of the handle angle on the basis of changing amounts of the inclined direction and the inclined angle detected, wherein the changing a handle angle of the virtual handle includes changing the handle angle on the basis of the changeable amount determined.

According to the method, it is possible to obtain the same effect as one of the method of the first aspect of the present invention, and to relate operation of the operating handle to the handle angle properly. That is, in case the handle angle is rotated one time when the operating handle is rotated two times, it is possible to gain a stroke of the operating handle more and operate the handle angle more finely. In case one rotation of the operating handle corresponds to one rotation of the handle angle, it is possible to operate the handle angle more quickly. As a result, it is possible to determine a more proper operation stroke according to contents of the game or proficiency of the player.

Preferably, in the game performing method of the first aspect of the present invention, the changing a handle angle of the virtual handle includes changing the handle angle when the inclined angle is not less than a threshold angle and the change in the inclined direction is detected by detecting the inclined direction and the inclined angle of the operating handle.

According to the method, it is possible to obtain the same effect as one of the method of the first aspect of the present invention, and to determine the input to be invalid when the inclined angle of the operating handle is a small inclination which does not amount to the threshold angle. Consequently, for example, it is possible to prevent a very small inclination when a finger is attached to the operating handle or manufacturing errors of the operating handle from causing input undesired by the player. Further, it is possible to make the player incline the operating handle sufficiently and play the game by the stroke desired by a game producer.

Preferably, in the game performing method of the first aspect of the present invention, the changing a handle angle of the virtual handle includes determining whether the change in the inclined direction detected satisfies a predetermined condition or not, and keeping the handle angle when determining that the change in the inclined direction satisfies the predetermined condition.

According to the method, it is possible to obtain the same effect as one of the method of the first aspect of the present invention, and to determine input to be invalid when the inclined direction is changed extremely. For example, it is possible to recover the input when the player erroneously detaches a finger from the operating handle and again inclines the operating handle to a position close to a position just before the player detaches the finger, that is, a position included within a predetermined sphere, while playing the game. On the other hand, it is possible to determine the input to be invalid when the player again inclines the operating handle to a position far from the position just before the player detaches the finger in confusion. Consequently, it is possible to prevent movement of the player character from changing suddenly in an irregular state undesired by the player.

Preferably, the above-described game performing method further comprises: storing the inclined angle as history information when the inclined angle amounts to the threshold angle by detecting the inclined direction and the inclined angle of the operating handle; and changing the threshold angle on the basis of the history information.

Because the player performs the operation for inclining and rotating the operating handle with a finger thereof, a locus of the operation does not always draw a fine arc. For example, the player is a youth, the rotation radius of the operating handle becomes small necessarily. Therefore, in case a characteristic of the operation performed by the player and the threshold angle is close to each other, there is a case the input of the operation is determined to be invalid frequently and it becomes difficult to play the game.

According to the method, it is possible to obtain the same effects as those of the above-described method, and to store history information when the inclined angle of the operating handle does not amount to the threshold angle. The history information is, for example, information as to what sphere in an inclined direction and how many times the inclined angle of the operating handle does not amount to the threshold angle or the like, and properly determined according to contents of the game or the like. For example, when the inclined angle does not amount to the threshold angle frequently, the threshold angle is reduced or the like. Consequently, it is possible to make the threshold angle correspond to the characteristic of the operation performed by the player with attaining an object of determining the threshold angle, and realize more smooth game play.

Preferably, in the game performing method of the first aspect of the present invention, the operating handle is a stick-shaped one, and the input section holds the operating handle in an upright position at an approximately central position of a movable sphere of the operating handle in a neutral state of the operating handle.

Preferably, in the game apparatus of the second aspect of the present invention, the operating handle is a stick-shaped one, and the input section holds the operating handle in an upright position at an approximately central position of a movable sphere of the operating handle in a neutral state of the operating handle.

According to the method or the apparatus, it is possible to obtain the same effect as one of the method of the first aspect or the apparatus of the second aspect of the present invention. Further, the operation handle stands so as to be projected from the approximately central position of the movable sphere in the neutral state. The neutral state means a state any force is not applied to the operating handle. Therefore, the operating handle is inclined and operation is inputted through the operating handle in this state as default. Consequently, it is possible to make the player understand the present state of the operation of the operating handle easily at a glance, and make the player get used to the operation of the operating handle easily.

The above-described approximately central position means not only a exactly central position of the movable sphere of the operating handle but also an uneven central position caused by manufacturing errors, change as time passes such as conformability, setting or the like, or the like.

In accordance with a third aspect of the present invention, a game performing method for an apparatus comprising an input section having an analog operating section capable of inputting a first coordinate and a second coordinate at one operation, comprises: controlling a virtual handle of a player character according to operation inputted through the analog operating section; detecting coordinates of the first coordinate and the second coordinate inputted through the analog operating section; and changing a handle angle of the virtual handle according to change in the coordinates of the first coordinate and the second coordinate detected.

In accordance with a fourth aspect of the present invention, a game apparatus comprises: an input section having an analog operating section capable of inputting a first coordinate and a second coordinate at one operation; a control section for controlling a virtual handle of a player character according to operation inputted through the analog operating section; a detecting section for detecting coordinates of the first coordinate and the second coordinate inputted through the analog operating section; and a changing section for changing a handle angle of the virtual handle according to change in the coordinates of the first coordinate and the second coordinate detected by the detecting section.

The analog operating section capable of inputting a first coordinate and a second coordinate at one operation is, for example, a joy stick, a track pad, a mouse, a pen-tablet or the like, and means a pointing device for inputting two coordinate values at one time. Therefore, the analog means not an exact analogue which is an antonym of a digital but a type capable of inputting a plurality of gradual values, for example, 0 to 300.

According to the method of the third aspect or the apparatus of the fourth aspect of the present invention, when the first coordinate and the second coordinate inputted through the analog operating section are changed, that is, when the player operates the analog operating section so as to move the analog operating section in an oblique direction or draw a curve to change both coordinates, the virtual handle is rotated. Consequently, when the player operates the analog operating handle so as to move it in an oblique direction or draw a curve, the player can operate the player character. In comparison with an earlier development in which the player simply operates the analog operating section linearly in front and rear directions or in right and left directions, it is possible to gain a stroke of operation and to input finer operation. Further, when the player rotates and operates the analog operating section, because movement for rotating the analog operating section is connected to movement for rotating the virtual handle sensuously, it is possible to enhance sensory perception of the game more.

Preferably, in the game performing method of the first or third aspect of the present invention, the changing a handle angle of the virtual handle includes changing the virtual handle within an angle changeable sphere, and determining the handle angle to be a limited value of the angle changeable sphere when the handle angle exceeds the angle changeable sphere.

According to the method, it is possible to obtain the same effect as one of the method of the first or third aspect of the present invention, and it is possible to control the rotation of the handle. Consequently, for example, when the player character is a race car, it is possible to prevent a handle or a tire of the race car from being turned forever.

Preferably, the above-described game performing method further comprises: outputting predetermined information when the handle angle is the limited value of the angle changeable sphere.

The outputting predetermined information includes to display a screen, output sounds, vibrate and so on, and a system for outputting predetermined information is not limited.

According to the method, it is possible to obtain the same effect as one of the above-described method, and it is possible to inform the player of the state the virtual handle is not rotated any more. Consequently, it is possible to prevent the player from trying to operate the operating handle or the analog operating section more although the virtual handle can not be turned any more.

Preferably, the game performing method of the first aspect of the present invention, further comprises: determining whether the inclined direction and the inclined angle of the operating handle detected satisfy a predetermined condition or not, and changing the handle angle so as to bring the handle angle close to a predetermined angle gradually when determining that the inclined direction and the inclined angle satisfy the predetermined condition.

Preferably, the game performing method of the third aspect of the present invention, further comprises: determining whether the coordinates of the first coordinate and the second coordinate detected satisfy a predetermined condition or not, and changing the handle angle so as to bring the handle angle close to a predetermined angle gradually when determining that the coordinates satisfy the predetermined condition.

According to the method, it is possible to obtain the same effect as one of the method of the first or third aspect of the present invention, and it is possible to reproduce a virtual force applied to the virtual space and provide more interest and reality for the game.

Preferably, in the above-described game performing method, the determining whether the inclined direction and the inclined angle of the operating handle detected satisfy a predetermined condition or not includes determining that the inclined direction and the inclined angle satisfy the predetermined condition when the inclined direction and the inclined angle are not changed for a predetermined time or more.

Preferably, in the above-described game performing method, the determining whether the coordinates of the first coordinate and the second coordinate detected satisfy a predetermined condition or not includes determining that the coordinates satisfy the predetermined condition when the coordinates are not changed for a predetermined time or more.

According to the method, for example, when the virtual handle is a driving handle of a car, it is possible to reproduce a so-called return of the driving handle returning to a go-straight state when hands are detached from the driving handle. Consequently, it is possible to realize a game having a high sensory perception.

Preferably, the game performing method of the first or third aspect of the present invention, further comprises: displaying a display object for expressing a present state of the handle angle.

According to the method, it is possible to obtain the same effect as one of the method of the first or third aspect of the present invention, and it is possible to inform the player of the present turned state of the virtual handle more clearly, and realize a more smoothly game play. Further, when the player erroneously detaches from the operating handle or the analog operating section when playing the game, it is possible to fix player's aim while the player again inclines the operating handle or the analog operating section.

Preferably, the game performing method of the first or third aspect of the present invention, further comprises: moving a predetermined part of the player character according to the handle angle of the virtual handle.

According to the method, it is possible to obtain the same effect as one of the method of the first or third aspect of the present invention. Further, because an external appearance of the player character can be changed, it is possible to generate more realistic game screens.

In accordance with a fifth aspect of the present invention, a storage medium has information recorded thereon, when the information is loaded onto the apparatus, the information making the apparatus execute the method of the first or third aspect of the present invention.

The storage medium is a medium which can be read by the apparatus, for example, an IC memory card, a CD-ROM, a MO, a DVD or the like.

According to the storage medium, it is possible to make the apparatus realize the same effect as one of the method of the first or third aspect of the present invention.

In accordance with a sixth aspect of the present invention, a data signal embodied in a carrier wave, comprises information used for executing the method of the first or third aspect of the present invention.

In accordance with a seventh aspect of the present invention, a program makes the apparatus execute the method of the first or third aspect of the present invention, when the program is loaded onto the apparatus.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 3 is a block diagram showing an example of the functional structure according to the first embodiment;

FIG. 4A is a view showing an example of a data structure of an angle converting table (TBL) 754, and FIGS. 4B and 4C are views showing relationships among an input angle θi, a stack angle θs and a handle angle θh;

PREFERRED EMBODIMENTS OF THE INVENTION

[First Embodiment]

In the following, the first embodiment of the present invention will be explained with reference to FIGS. 1A to 10B. In the first embodiment, a case where the present invention is applied to handle operation in a car race game performed by a consumer game apparatus will be described. However, the application of the present invention is not limited only to the case.

The present invention can be applied to not only the handle operation in the car race game, but also, for example, operation of an object having a limited rotation angle such as handle operation in a motorbike race game, rudder operation in a boat race game, operation of a turret slewing handle in a shooting game, bulb opening and closing operation in an adventure game or the like.

[Explanation of Structure]

Figure 1A:
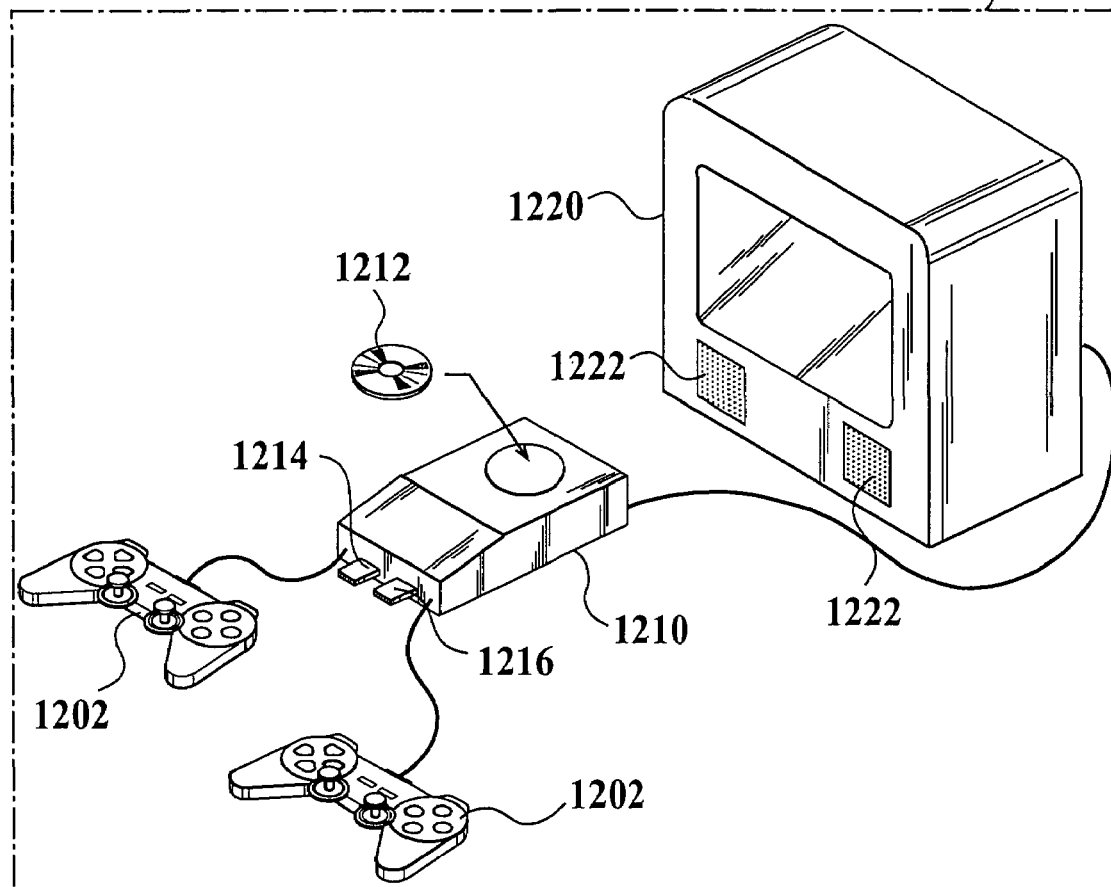
FIGS. 1A and 1B are views showing examples of a case where the present invention is applied to a consumer game apparatus.
Figure 1B:
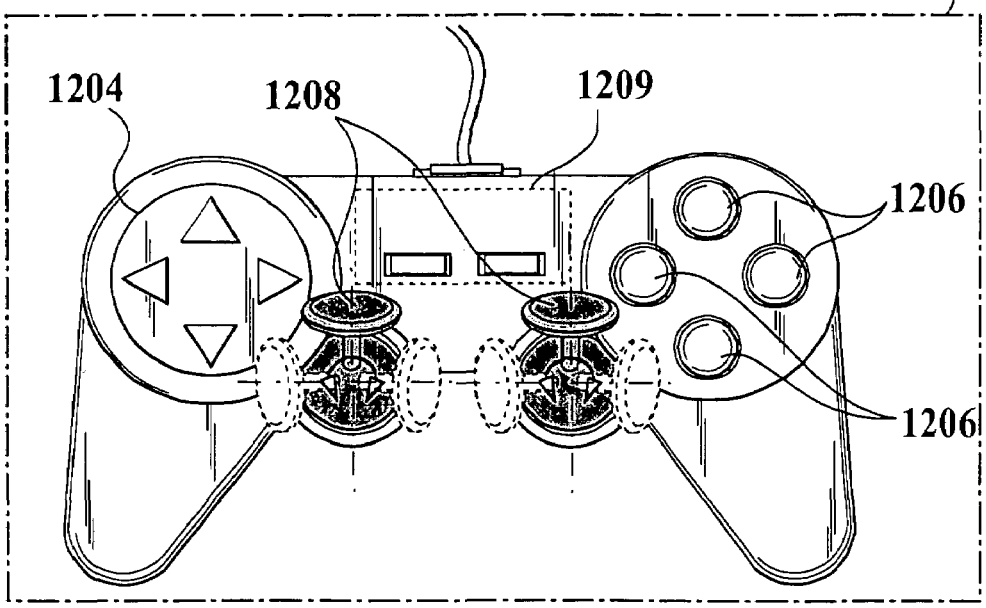

FIGS. 1A and 1B are views showing examples of the case where the present invention is applied to a consumer game apparatus 1200. As shown in the whole external view of the game apparatus 1200 of FIG. 1A, the consumer game apparatus 1200 comprises game controllers 1202 and an apparatus body 1210, and is connected to a display 1220 equipped with speakers 1222.

Game information including programs and data required to execute games is stored in, for example, a CD-ROM (compact disk read only memory) 1212, an IC (integrated circuit) memory 1214, a memory card 1216 or the like which is a data storage medium capable of being attached to and detached from the apparatus body 1210.

The apparatus body 1210 builds in a computer, and executes the car race game by reading out the game information stored in the CD-ROM 1212, the IC memory 1214, the memory card 1216 or the like and performing operation processing based on the read game information. Then, when receiving operation signals inputted through the game controllers 1202, the apparatus body 1210 executes various kinds of game processing. Thereby, when the apparatus body 1210 generates image signals of game screens and game sound signals, the apparatus body 1210 makes the display 1220 display the game screens thereon and the speakers 1222 output game sounds therefrom.

As shown in FIG. 1B, the game controllers 1202 are means for a player to input game operation. Each of the game controllers 1202 comprises, for example, a cross key 1204, buttons 1206, joy sticks 1208 and a vibrator 1209, and outputs operation signals to the apparatus body 1210.

The joy sticks 1208 are a kind of well known pointing devices, and detect inclination angles of their stick-like operating handles two-dimensionally. The joy sticks 1208 output coordinate values detected by, for example, a combination of front and rear directions (up and down directions in the drawing) and right and left directions or a combination of a radius and a polar axis rotation angle. The present embodiment includes Cartesian coordinates composed of an Y-axis in the front and rear directions and an X-axis in the right and left directions. It is supposed that the X coordinates and the Y coordinates are outputted within a scope from "−1.0" to "1.0" when coordinates outputted at the time of neutral states of the joy sticks 1208 are determined to be "0". Incidentally, the neutral states mean upright states of the joy sticks 1208 when the joy sticks 1208 are not operated at all. Moreover, it does not matter especially whatever a method for detecting inclinations of levers of the joy sticks 1208 may be.

The vibrator 1209 is a vibration generator for vibrating the game controller 1202. It is possible to inform the player of situations (for example, a crash of the race car, a bad road run or the like) of games.

Figure 2A:
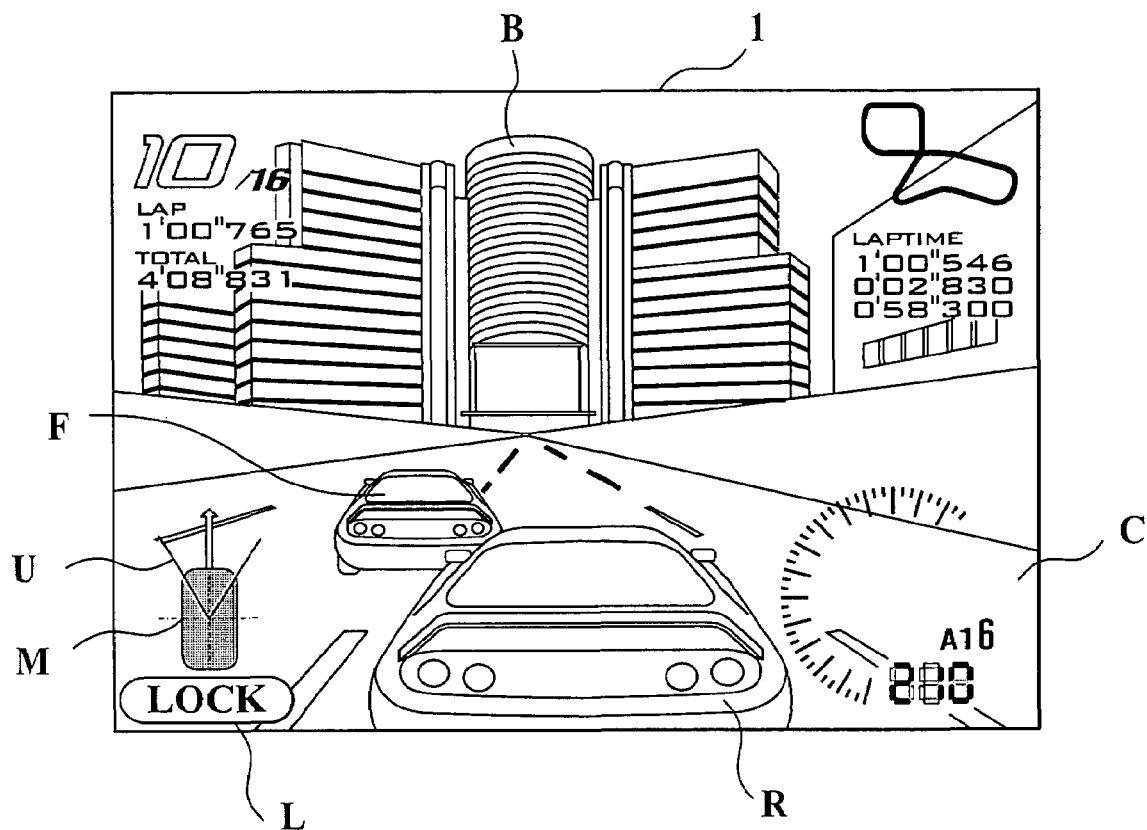
FIG. 2A is a view showing an example of a game screen according to a first embodiment.
Figure 2B:
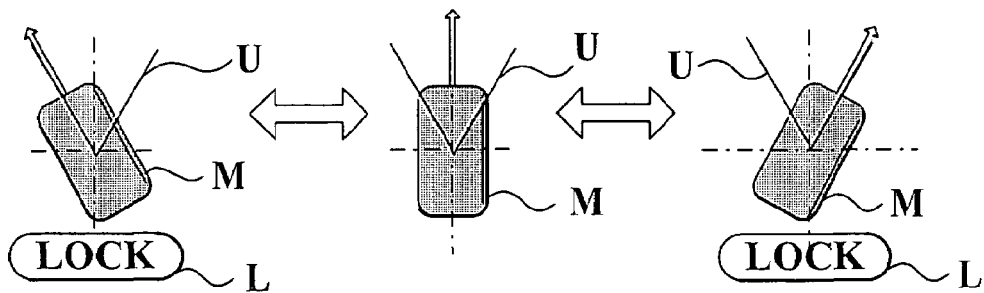
FIG. 2B is a view showing examples of display of a tire mark.

FIG. 2A is a view showing an example of a game screen of the present embodiment, and FIG. 2B is a view showing display examples of a tire mark M. As shown in FIG. 2A, a game screen 1 in the present embodiment is rendered as an image viewed from a predetermined view point in a three-dimensional virtual space (a game space) in which objects are disposed. As the objects, a race car object R operated by the player, a course object C, a background object B and an opponent car object F are arranged in the game space. Moreover, according to the present embodiment, the tire mark M which axially rotates in the right and left directions in the screen according to handle operation, and a lock mark L are displayed on the game screen.

The tire mark M is an object imitated as a tire of the race car object R, and indirectly expresses a present angle and a turning degree of a handle of the race car object R. For example, an arrow is attached to the tire mark M for visually exhibiting the present turning degree of the handle in a handle angle limited sphere U. As shown in FIG. 2B, the lock mark L is displayed only when the handle is locked in either the right direction or the left direction, and informs the user of the locking.

While the player watches game screens displayed on the display 1220, the player operates the cross key 1204, the joy sticks 1208, the various kinds of buttons 1206 or the like, which are mounted on each of the game controllers 1202, to input game operation such as accelerator and brake operation, shifting operation, handle operation or the like. Thus, the player can enjoy playing the car race game. In the present embodiment, the player can perform handle operation of the race car object R with the joy sticks 1208.

[Explanation of Functional Block]

FIG. 3 is a block diagram showing an example of the functional structure in the first embodiment. As shown in FIG. 3, the game apparatus 1200 comprises an input unit 10, a processing unit 20, a display unit 30, a sound output unit 40, a vibrating unit 50 and a storage unit 70.

The input unit 10 accepts various kinds of game operation, and outputs operation signals to the processing unit 20. The game operation includes, for example, a selection of menus, inputs of operation of the accelerator and the brake, shifting operation, handle operation, view point switching operation and so on. The input unit 10 can be realized by hardware such as the cross key, a lever, the buttons or the like.

In the present embodiment, the input unit 10 includes an operating handle 12. The operating handle 12 is a stick-like lever capable of being freely inclined in front, rear, right and left directions. The operating handle 12 inputs two-dimensional coordinate values simultaneously by detecting inclinations of the lever. In the example of FIG. 1, the joy sticks 1208 correspond to the operating handle 12.

The processing unit 20 controls the whole game apparatus 1200, instructs each functional block of the game apparatus 1200 and performs various kinds of operation processing such as the game operation or the like. The function of the processing unit 20 is realized by hardware such as a CPU (central processing unit) (a CISC (complex instruction set computer) type or a RISC (reduced instruction set computer) type), an ASIC (application specific integrated circuit) (a gate array or the like) or the like, a related control program or the like. In the example of FIG. 1, the computer and the like built in the apparatus body 1210 corresponds to the processing unit 20.

The processing unit 20 further includes a game operating unit 22 for performing operation processing for the game chiefly, an image generating unit 24 for generating image signals from various data obtained according to the processing performed by the game operating unit 22, a sound generating unit 26 for generating sound signals of game sounds, and a vibration generating unit 28 for generating vibrating signals.

The game operating unit 22 executes various game processing on the basis of operation signals inputted through the input unit 10, the game information read out of the storage unit 70, or the like. For example, the game operating unit 22 executes a processing for determining a virtual space, disposing and moving objects into the virtual space, determining a hit, timing lap time, obtaining game results (scores), determining a position of the view point or an eyes direction or the like, as the game processing.

The game operating unit 22 further includes an input angle determination unit 222, a handle angle determination unit 224 and an object movement control unit 226.

The input angle determination unit 222 obtains input angles θi in the directions in which the operating handle 12 is inclined on the basis of the operation signal inputted through the operating handle 12.

Figure 5A:
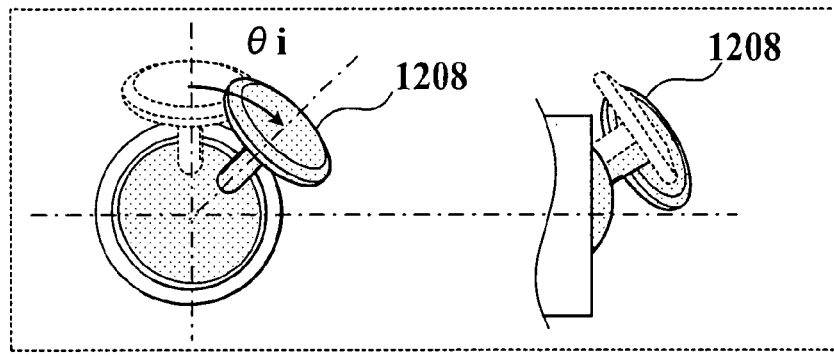
FIGS. 5A, 5B, 5C and 5D are views for explaining relationships between operation of a joy stick and control of a race car object.
Figure 5B:
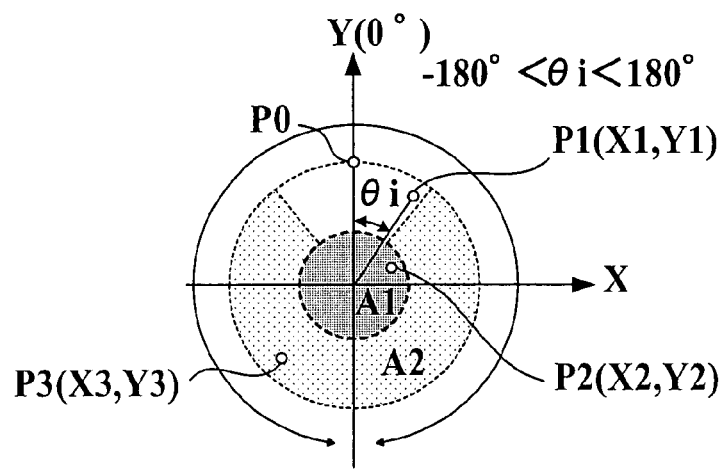

FIGS. 5A, 5B, 5C and 5D are views for explaining a relationship between the operation of one of the joy sticks 1208 and the control of the race car object R. FIG. 5A shows a plan view and a side view exhibiting an operation state of the joy stick 1208. FIG. 5B shows a relationship between the input value from the joy stick 1208 and the input angle θi. The Y-axis direction corresponds to the front and rear directions of the joy stick 1208, and the X-axis direction corresponds to the right and left directions of the joy stick 1208. Points P indicate positions inputted through the joy stick 1208.

The operation signal from the joy stick 1208, i.e. the operating handle 12, includes two kinds of values of the Y-value indicating the coordinates in the front and rear directions and the X-value indicating the coordinates in the right and left directions. Each of the X-value and the Y-value takes a value within a scope from "−1.0" to "1.0". In FIG. 5B, the X-value and the Y-value are exhibited as the point P(X, Y).

The input angle determination unit 222 obtains the angle between a line segment from the origin to the point P and the Y-axis, and determines it to be the input angles θi. More specifically, for example, the input angle determination unit 222 determines the input angles θi within the scope of −180 <θi<180° when the positive side of the X-axis is taken as a plus side and the negative side of the X-axis is taken as a minus side on the basis of the value of atan(X/Y) (atan: arc tangent) and a sign relation of the X-value and the Y-value.

Moreover, the input angle determination unit 222 determines an input invalid sphere A1 on the periphery of the origin of the XY-coordinates. When both the Y-value and the X-value of the operation signal are included in the input invalid sphere A1, the input angle determination unit 222 considers the joy stick 1208 not to be sufficiently inclined. Therefore, the input angle determination unit 222 determines that the input is invalid, and holds the input angle θi at that time without updating it.

Thereby, the present embodiment prevents, for example, the following occurrence as being invalid. That is, the occurrence is: input which is caused by manufacturing errors of the joy stick 1208 and which is undesired by the player; erroneous input which is caused by the operation of the operating handle 12 passing through the vicinity of the center without being sufficiently inclined because the player wants to turn the handle in haste; erroneous input which is caused by swingback of the joy stick 1208 (a phenomenon of the joy stick 1208 which is inclined by a little amount in an opposite direction by the inertia of the joy stick 1208 after the joy stick 1208 returned to its neutral state) when the player erroneously detaches a finger from the joy stick 1208; or the like. For example, in FIG. 5B, because a point P2 is included in the input invalid sphere A1, the input is made to be invalid. Incidentally, in the present embodiment, the scope of the input invalid sphere A1 is fixed.

Moreover, the input angle determination unit 222 determines an input invalid sphere A2 on the basis of the present input position, and updates the input invalid sphere A2 appropriately every when detecting the input position. When the input angle θi inputted at the present time is distant from the preceding input angle θi by a predetermined angle or more, the input angle determination unit 222 determines the input angle θi inputted at the present time to be invalid. Then, the input angle determination unit 222 holds the preceding input angle θi without updating the input angle θi.

More specifically, for example, in FIG. 5B, when a position indicating a point P1 is inputted with the joy stick 1208 subsequently to the preceding input position P0, because the point P1 is not included in the input invalid sphere A2, the input is made to be valid. When points P2 and P3 are inputted, because the points P2 and P3 are included in the input invalid sphere A1 or A2, the inputs are made to be invalid.

Thereby, it is possible to obtain an advantage to make operation made by the player who erroneously detaches his or her finger from the joy stick 1208 and inclines the joy stick 1208 from the neutral state into arbitrary directions at a stroke in a fluster invalid. For example, when the player detaches the joy stick 1208 in the state of being at the point P1 and inclines the joy stick 1208 to the point P3, the input angle is rapidly inverted. Then, an unsuitable case as the operation of the race car is produced. The present embodiment can avoid such the case.

When the player detaches a finger from the joy stick 1208 in the present embodiment, the player brings down the joy stick 1208 in an arbitrary inclination direction and rotates the joy stick 1208 into a desired operation direction (for example, rotates the joy stick 1208 clockwise when the player wants to turn the race car object R to the right). Thereby, the operation returns to the normal condition at the point of time when the point designated by the joy stick 1208 has gotten away from the input invalid sphere A2. Alternatively, when the player roughly brings the joy stick 1208 down in the preceding inclination direction and swings the joy stick 1208 in right and left directions, the operation returns to the normal state at the point of time when the point designated by the joy stick 1208 has gotten away from the input invalid sphere A2. In both cases, the return to the normal operation state is determined on the basis of the behavior of the race car object R on the game screen.

Incidentally, it is needless to say that a structure determining an input valid sphere A3 being a complementary sphere of the input invalid spheres A1 and A2 and performing the comparison with the designated points may be adopted in place of the structure determining the input invalid spheres A1 and A2.

The handle angle determination unit 224 determines a handle angle θh which is a rotation angle of the virtual handle of the race car object R on the basis of the input angle θi obtained by the input angle determination unit 222.

Figure 5C:
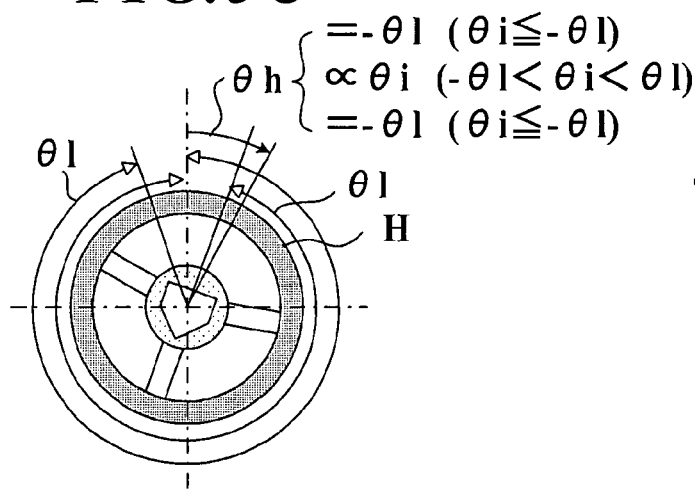
Figure 5D:
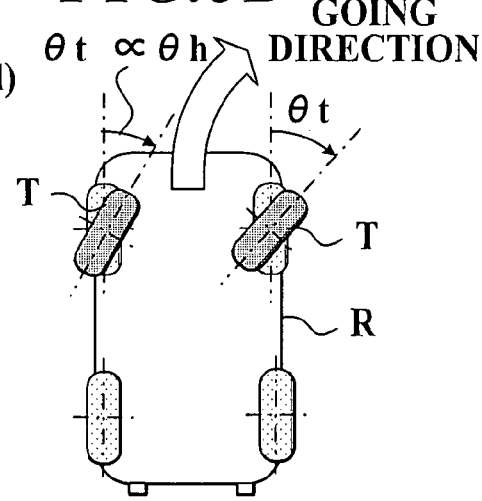

FIGS. 5A, 5B, 5C and 5D are views for explaining the relationship between the operation of the joy stick 1208 and the control of the race car object R. FIG. 5C is a view for illustrating the determination of the handle angle θh, and FIG. 5D is a view for illustrating the handling determination of the race car object R. Incidentally, although FIGS. 5A–5D show only a case where the handle is turned to right direction for convenience' sake, it is needless to say that the handle can be turned to the left direction similarly.

A rotatable scope of the handle is determined structurally. The rotatable scope is called as a "handle angle limited sphere". The handle angle limited sphere is expressed as, for example, "lock to lock 1.8 rotations" in case of the race car. On the other hand, joy sticks 1208 can rotate to any degree. The handle determination unit 224 correlates both the angles.

More specifically, the input angle θi is obtained by the input angle determination unit 222, for example, as a value within the scope from −180° to 180° as shown in FIG. 5B. When the joy stick 1208 is rotated by one revolution into the right direction from the state in which the race car object R is going straight, the input angle θi which has been increasing from 0°, inverts its sign at the angle of 180°, and then increases from −180° toward 0° after that. The handle angle determination unit 224 examines the changes of the sign at the angle of 180°, and counts a handle rotation number N. Then, the handle angle determination unit 224 calculates the handle angle θh in accordance with, for example, the following formula: handle angle θh=(θi+360°×handle rotation number N). Thereby, the handle angle determination unit 224 determines angles which exceed 180°, of the handle angle θh in both of the right and left rotation directions thereof.

Then, the handle angle determination unit 224 determines the handle angle limited sphere (from −θ1 to θ1 in FIG. 5C) of the handle angle θh. Then, when the handle angle θh is within the handle angle limited sphere, the handle angle determination unit 224 determines the handle angle θh on the basis of the input angle θi by the method described above. When handle angle θh exceeds the handle angle limited sphere, the handle angle determination unit 224 holds the handle angle θh at a limitation value θ1 of the handle angle limited sphere, even though the input angle θi is inputted so as to increase furthermore. For example, in case of the determination of the above-described "lock to lock 1.8 rotations", the handle angle limited sphere is determined to be a scope from −324° to 324°. When the input angle θi exceeds the handle angle limited sphere, the handle angle θh is fixed to −324° in case of the right side locking, or to 324° in case of the left side locking.

Consequently, when the player inclines the joy stick 1208 and rotates it in the direction into which the player wants to turn the handle, the handle is turned according to the operation of the joy stick 1208 when the handle angle θh is within the handle angle limited sphere. However, when the handle angle θh exceeds the handle angle limited sphere, because the handle is not turned any more even though the joy stick 1208 is further rotated, the handle is in a state of the so-called locked state. It is needless to say that, when the joy stick 1208 is operated in the direction in which the handle is turned back so that the handle angle θh is again included within the handle angle limited sphere, the handle angle θh indicates an angle within the handle angle limited sphere.

Moreover, when the X-value and the Y-value of the operation signal are included in the input invalid sphere A1 or A2 for a period of time equal to or longer than a predetermined period of time, the handle angle determination unit 224 regards the case as a situation in which the player detaches a finger from the joy stick 1208, and determines to execute a subtraction for restoring the input angle θi to "0" gradually. Thereby, the so-called handle return can be reproduced.

The object movement control unit 226 operates the movement of the race car object R on the basis of the handle angle θh determined by the handle angle determination unit 224, and controls the movement of the race car object R on the basis of the operated results.

More specifically, the object movement control unit 226 regards the handle angle θh as a turn angle of the handle of the race car object R, operates turning movement of the race car object R on the basis of the turn angle of the handle, and controls the position of the race car object R (see FIG. 5D). Furthermore, the object movement control unit 226 obtains turn angles θt of the tires of the race car object R at a predetermined rate, and changes the direction of the tire objects T (see FIG. 5D) to the frame of the race car object R.

The image generating unit 24 is realized by hardware such as a CPU, a DSP (digital signal processor), an IC only for image generation, an IC memory or the like, image processing software or the like. The image generating unit 24 generates image signals of game screens on the basis of instruction signals, various kinds of coordinate information or the like from the game operating unit 22.

The sound generating unit 26 is realized by hardware such as a CPU, a DSP, and IC memory or the like, sound processing software or the like. The sound generating unit 26 generates sound signals such as sound effects, back ground music (BGM), alarms or the like on the basis of instruction signals from the game operating unit 22.

The vibration generating unit 28 generates vibrating signals for controlling the vibrator 1209 on the basis of instruction signals from the game operating unit 22.

The display unit 30 displays game screens on the basis of image signals generated by the image generating unit 24. The display unit 30 can be realized by hardware such as a CRT (cathode ray tube), a LCD (liquid crystal display), an ELD (electroluminescent device), a PDP (plasma display panel), a HMD (head-mounted display) or the like. In the example of FIG. 1, the display 1220 corresponds to the display unit 30.

The sound output unit 40 is realized by, for example, a speaker, and outputs sounds such as sound effects, BGM or the like on the basis of sound signals generated by the sound generating unit 26. In the example of FIG. 1, the speaker 1222 built in the display 1220 corresponds to the sound output unit 40.

The vibrating unit 50 generates vibrations in accordance with vibrating signals generated by the vibration generating unit 28. In the example of FIG. 1, the vibrator 1209 corresponds to the vibrating unit 50.

The storage unit 70 stores a system program (not shown) for controlling the game apparatus 1200 in integration, data (not shown) required to perform operation processing, game information 72 including programs for executing various kinds of game processing, data such as determined values or the like, or other data. The storage unit 70 is realized by a data storage medium such as a CD-ROM, a game cassette, an IC card, a MO (magneto-optical disc), a FD (floppy disk) (R), a DVD (digital versatile disc), an IC memory, a hard disk or the like.

The game information 72 stores kinds of programs and data required to execute the car race game. In the present embodiment, the programs include an input angle determination program 722 as information for making the input angle determination unit 222 of the processing unit 20 function, a handle angle determination program 724 as information for making the handle angle determination unit 224 function, and an object movement control program 726 as information for making the object movement control unit 226 function.

The data of game information 72 include an operating handle input value 742 storing input values (the above-mentioned X-value, the Y-value or the like) inputted through the operating handle 12, i.e. the joy stick 1208, an input angle θi (744) determined by the input angle determination unit 222, a stack angle θs (746) storing the preceding input angle θi, a handle rotation number N (747), a handle angle θh (748) determined by the handle angle determination unit 224, and an input invalid time counter 749.

The stack angle θs (746) stores the preceding value of the input angle θi before the input angle determination unit 222 of the game operating unit 22 updates the input angle θi.

The handle rotation number N (747) is a value which is increased or decreased when a rotation of the handle is considered to have exceeded a position of 180° of the Y-axis, for example, in a case where the input angle θi is within the scopes of 90°<θi<180° and −180°<θi<−90° and the sign of the input angle θi is different from the stack angle θs at that time. The index of the handle rotation number N (747) is a rotation number of the handle. The handle rotation number N (747) is determined to be "0" when the handle is not turned, namely the race car object R is in it's go-straight state.

The input invalid time counter 749 is counted every time when the input angle θi is included in the input invalid sphere A1 or A2a so that the input angle θi is not changed. The input invalid time counter 749 is a scale for measuring unchanged time.

Moreover, the game information 72 includes object data 750 required to dispose and display the race car object R, the tire mark M, the course object C, the background object B and the opponent car object F; input invalid sphere information 752 storing determination information of the input invalid spheres A1 and A2; and an angle converting table (TBL) 754 being information to which the handle angle determination unit 224 refers when determining the handle angle θh.

The input invalid sphere information 752 is information for determining, for example, the input invalid spheres A1 and A2. The input invalid sphere information 752 defines the input invalid spheres A1 and A2 by the use of, for example, scopes of X-value and Y-value which are input values of the operating handle 12, the scope of the input angle θi or the like.

Since the car race game is exemplified in the present embodiment, the default of the input invalid sphere A2 is made to be a sphere within a predetermined angle on both sides of right and left directions of the Y-axis as the center corresponding to the direction in the go-straight state of the race car object R. While the game is played, the default is made to be a sphere within a predetermined angle on both sides of right and left directions of the direction of the stack angle θs at that time as the center.

FIG. 4A is a view showing an example of the data structure of the angle converting TBL 754, and FIGS. 4B and 4C are views showing the relationships among the input angle θi, the stack angle θs and the handle angle θh. As shown in FIGS. 4A–4C, the angle converting TBL 754 stores an input angle sphere 754a, a stack angle sphere 754b and a handle rotation number variable values 754c correspondingly to one another. The handle rotation number variable value 754c is given in the case where the rotation of the handle exceeds the 180° position of the Y-axis. For example, in the case where the input angle θi is within the scopes of 90°<θi<180° and −180°<θi<−90° and the sign of the input angle θi is different from that of the stack angle θs at that time, because the rotation of the handle is considered to exceed the 180° position of the Y-axis, the handle rotation number variable value 754c is determined.

More specifically, as shown in FIG. 4B, when the input angle θi is within the scope of 90°<θi<180° and the stack angle θs is within the scope of −180°<θs<−90°, because it is considered that the joy stick 1208 has exceeded the 180° position of the Y-axis while rotating counterclockwise, "−1" is added to the handle rotation number N at that time. On the contrary, as shown in FIG. 4C, when the input angle θi is within the scope of −180°<θi<−90° and the stack angle θs is within the scope of 90°<θs<180°, because it is considered that the joy stick 1208 has exceeded the 180° position of the Y-axis while rotating clockwise, "1" is added to the handle rotation number N at that time. Then, the handle angle θh is obtained in accordance with the formula: handle angle θh=(input angle θi+360°×handle rotation number N), by the handle angle determination unit 224.

[Explanation of Processing Flows]

Next, processing flows in the present embodiment will be explained with reference to FIGS. 6 and 7.

Figure 6:
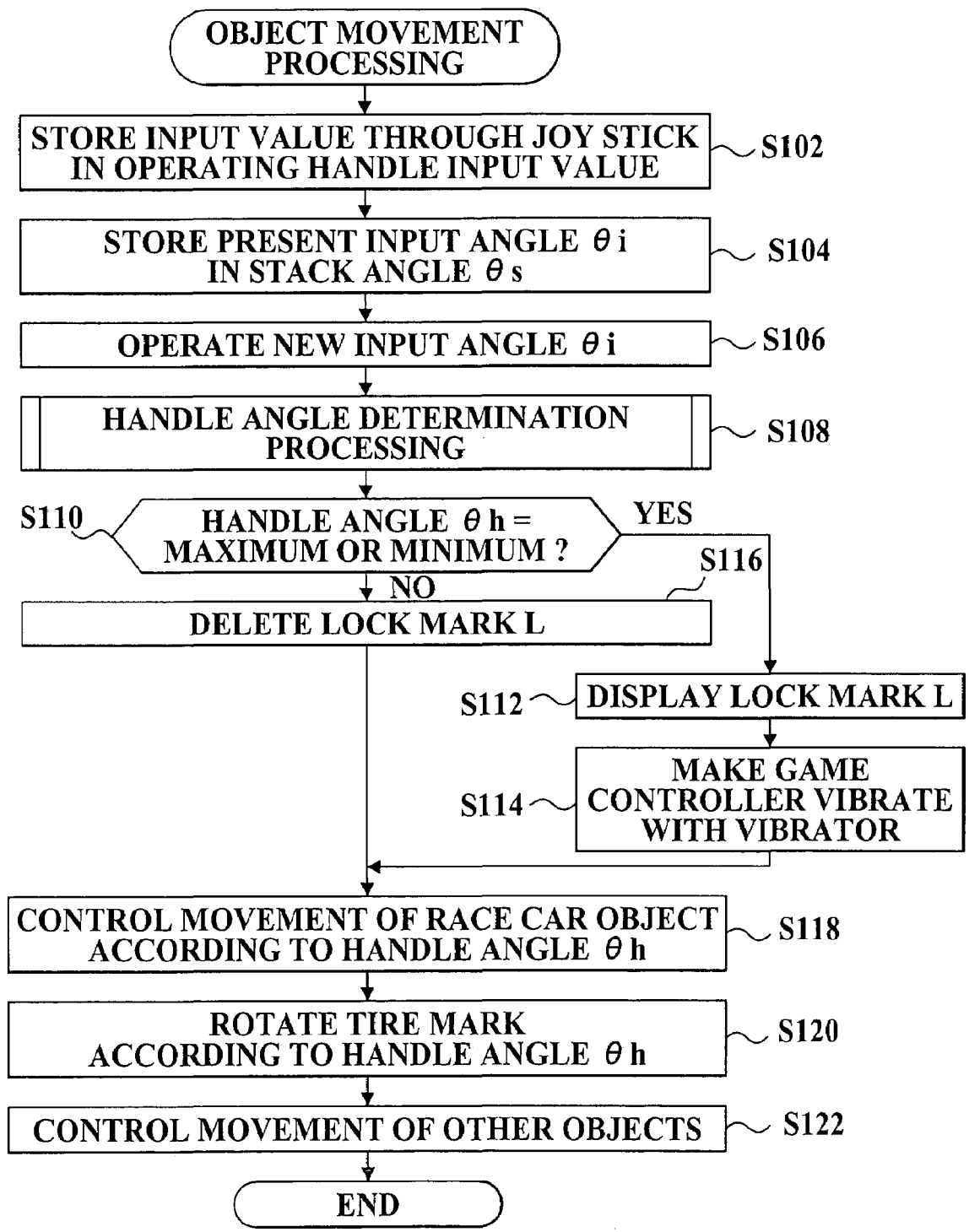
FIG. 6 is a flowchart for explaining a flow of object movement processing.

FIG. 6 is a flowchart for illustrating a flow of movement processing of objects of the present embodiment. The object movement processing is processing which is performed at a predetermined time interval while the car race game is played. The game operating unit 22 executes the object movement processing, for example, every several milliseconds to perform movement control of all of movable objects disposed in the game space. Then, the game operating unit 22 repeatedly generates screens every frame to display the game screens.

Incidentally, it is assumed that the input angle θi (744), the stack angle θs (746), the handle rotation number N (747), the handle angle θh (748) and the input invalid time counter 749 are severally determined to be "0" as the default at the time of starting the game.

As shown in FIG. 6, according to the object movement processing, the game operating unit 22 first stores the operation input value inputted through the joy stick 1208 in the operating handle input value 742 (Step S102).

Next, the input angle determination unit 222 stores the value of the present input angle θi into the stack angle θs 746 (Step S104), and operates a new value of the input angle θi based on the operating handle input value 742 (Step S106).

Next, the game operating unit 22 executes handle angle determination processing (Step S108).

Figure 7:
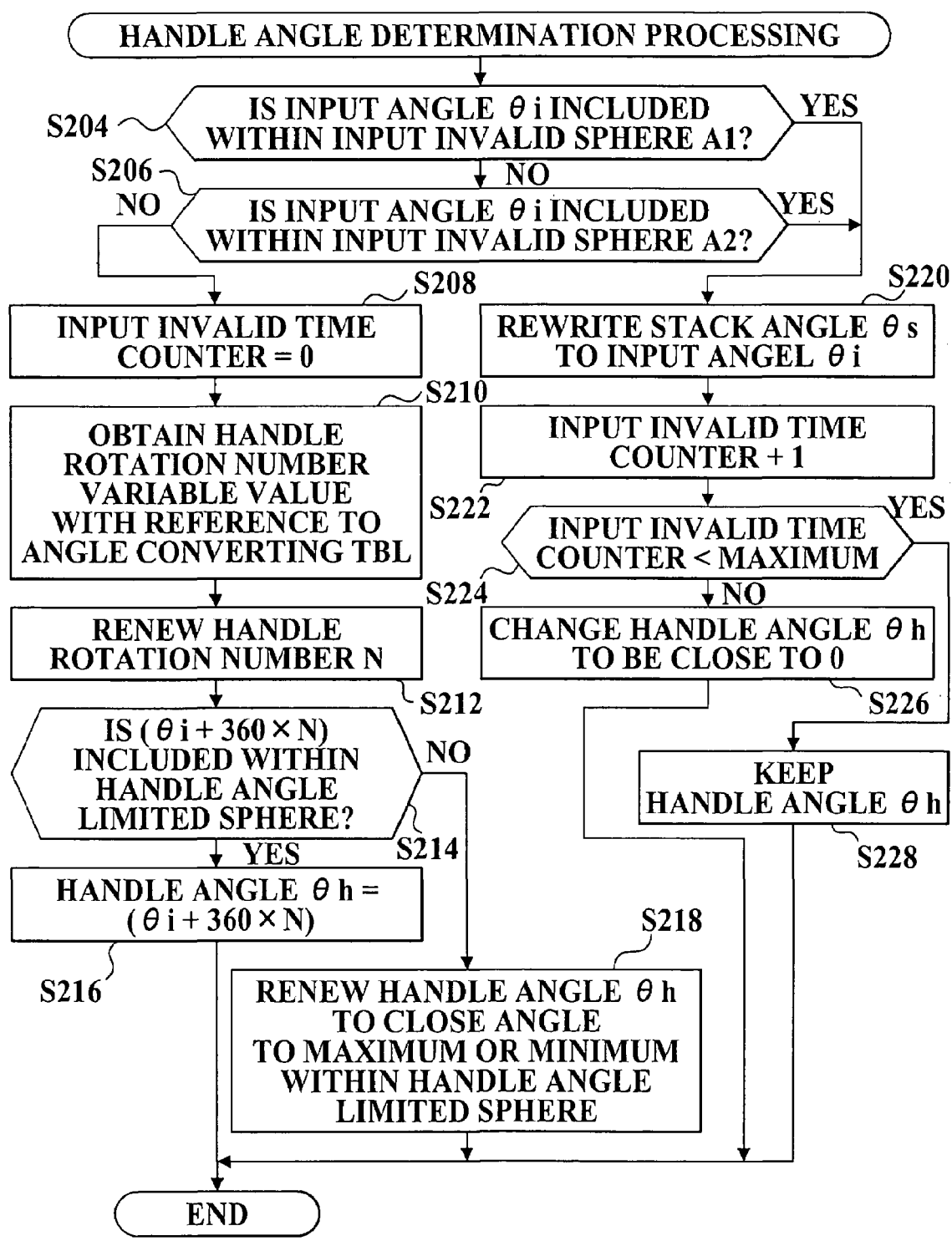
FIG. 7 is a flowchart for explaining a flow of handle angle determination processing according to the first embodiment.

FIG. 7 is a flowchart for illustrating a flow of the handle angle determination processing. As shown in FIG. 7, the input angle determination unit 222 first determines whether the newly obtained input angle θi is included within the input invalid sphere A1 or not (Step S204). When the newly obtained input angle θi is not included within the input invalid sphere A1 (Step S204; NO), the input angle determination unit 222 further determines whether the input angle θi is included within the input invalid sphere A2 or not (Step S206).

When the input angle θi is not included in any of the input invalid spheres A1 and A2 (Step S206; NO), the handle angle determination unit 224 first resets the input invalid time counter 749 to be "0" (Step S208). Then, the handle angle determination unit 224 obtains the handle rotation number variable value 754c corresponding to the values of the input angle θi and the stack angle θs with reference to the angle converting TBL 754 (Step S210), and renews the handle rotation number N (Step S212).

Next, the handle angle determination unit 224 obtains the value of (input angle θi+360×handle rotation number N), and determines whether the obtained calculation value is included within the handle angle limited sphere or not (Step S214).

When the calculation value is included within the handle angle limited sphere (Step S214; YES), the handle is considered not to be locked yet. Then, the handle angle determination unit 224 renews the handle angle θh (748) to be (input angle θi+360×handle rotation number N) (Step S216).

When the calculation value is not included within the handle angle limited sphere (Step S214; NO), the handle is considered to have been locked. Then, the handle angle determination unit 224 renews the handle angle θh to be the angle of the maximum value or the minimum value of the handle angle limited sphere (Step S218). In case of the above-described "lock to lock 1.8 rotations", the handle angle limited sphere is determined within the sphere from 324° to 324°. Thus, the handle angle θh is updated to be 324° in case of the right locked state, or to be 324° in case of the left locked state.

On the other hand, in Step S204 or S206, when the input angle θi is included within the input invalid sphere A1 or A2 (Step S204; YES or Step S206; YES), the handle angle determination unit 224 rewrites the value of the stack angle θs to the input angle θi, and holds the input angle θi without renewing it (Step S220). Then, the handle angle determination unit 224 increments the input invalid time counter 749 by "1" (Step S222).

When the value of the input invalid time counter 749 exceeds the predetermined maximum value after the increment, namely when the input angle θi is not updated for a predetermined time or longer (Step S224; NO), the handle angle determination unit 224 reduces and renews the handle angle θh at a predetermined rate to bring the handle angle θh close to "0" (Step S226).

When the value of the input invalid time counter 749 does not exceed the predetermined maximum value after the increment, namely when the input angle θi is not updated for a short time yet (Step S224; YES), the handle angle determination unit 224 does not update the handle angle θh to leave it as it is (Step S228).

When the processing up to this step has completed, the handle angle determination processing is finished, and the processing returns to the flow of FIG. 6.

In FIG. 6, next, when the handle angle θh is the maximum value or the minimum value (Step S110; YES), the game operating unit 22 displays the lock mark L indicating the state the handle is locked on the game screen (Step S112). Then, the vibration generating unit 28 generates the vibrating signal, and thereby the vibrator 1209 makes the game controller 1202 generate vibrations (Step S114).

When the handle angle θh is not the maximum value and the minimum value (Step S110; NO), the lock mark L is disappeared on the game screen (Step S116).

Then, the object movement control unit 226 controls the movement of the race car object R and the tire object T on the basis of the handle angle θh (Step S118), and rotates the tire mark M in the right direction or the left direction on the basis of the handle angle θh (Step S120). Moreover, the object movement control unit 226 controls the movement of other objects such as the opponent car object F, the course object C, the background object B or the like (Step S122).

[Hardware Structure]

Next, a hardware structure capable of realizing the present embodiment will be explained.

Figure 8:
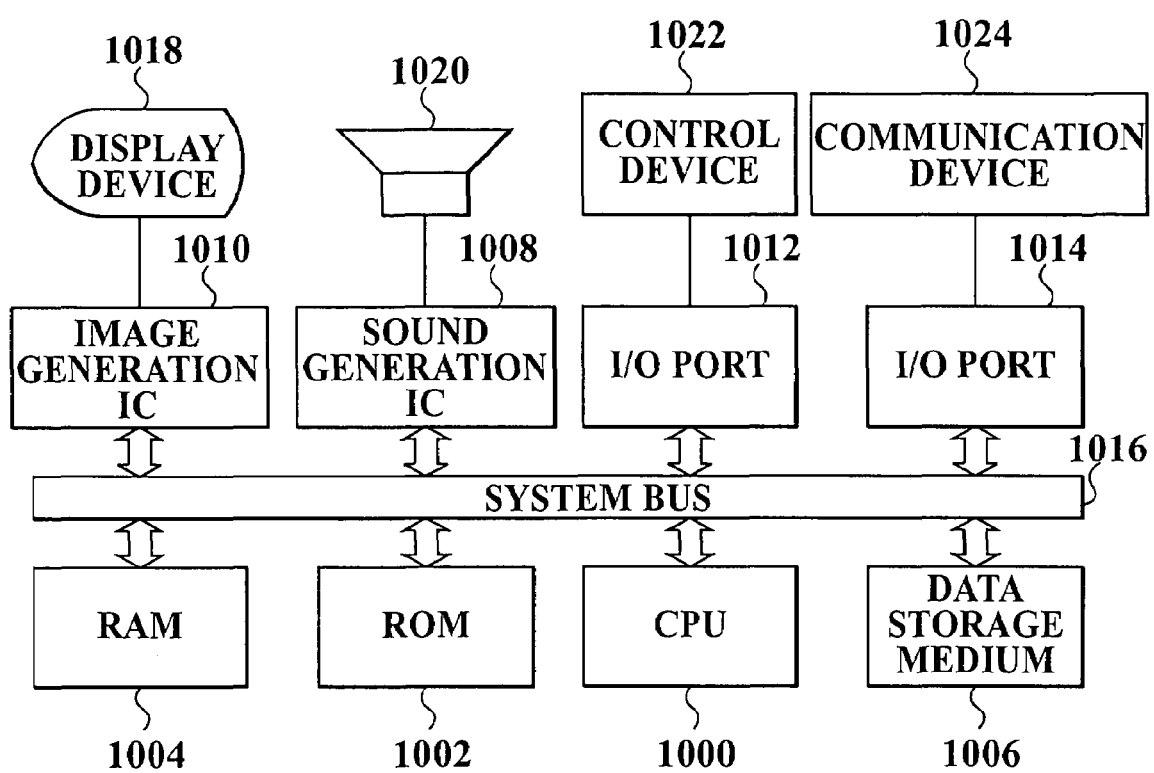
FIG. 8 is a view showing an example of a hardware structure capable of realizing the consumer game apparatus according to the first embodiment.

FIG. 8 is a diagram showing an example of the hardware structure according to the present embodiment. The apparatus as shown in FIG. 8 comprises a CPU 1000, a ROM 1002, a RAM 1004, a data storage medium 1006, a sound generation IC 1008, an image generation IC 1010, and I/O ports 1012 and 1014, which are interconnected by a system bus 1016 so that data can be exchanged therebetween.

A speaker 1020 is further connected to the sound generation IC 1018, a display device 1018 is further connected to the image generation IC 1010, a control device 1022 is further connected to the I/O port 1012, and a communication device 1024 is further connected to the I/O port 1014.

The data storage medium 1006 corresponds to the storage unit 70 shown in FIG. 3. The data storage medium 1006 primarily stores previously determined data including programs, image data, sound data or the like, play data for recording the game progressing state or the like, therein. For example, the data storage medium 1006 stores the game information 72 shown in FIG. 3. In case the present invention is applied to the consumer game apparatus 1200, for example, the CD-ROM 1212, the IC memory 1214, the DVD or the like is used as the data storage medium for storing the game program. Further, the memory card 1216 or the like is used as the data storage medium for storing the play data.

The control device 1022 is equivalent to the input unit 10 shown in FIG. 3. The control device 1022 corresponds to an operation panel, the game controllers 1202 shown in FIG. 1 or the like. Therefore, the control device 1022 is used so that the player inputs various game operation according to the progress of the game to the apparatus body 1210.

The CPU 1000 is equivalent to the processing unit 20 shown in FIG. 3. The CPU 1000 controls the whole apparatus and performs various data processing, according to the programs stored in the data storage medium 1006, the system program stored in the ROM 1002, the operation signal inputted through the control device 1022, or the like.

The RAM 1004 is storage means used as a work area or the like, for the CPU 1000. Further, the RAM 1004 stores given data stored in the data storage medium 1006 or the ROM 1002, or results of the operation performed by the CPU 1000, therein. The operating handle input value 742, the input angle 744, the stack angle 746, the handle rotation number 747, the handle angle 748, the input invalid time counter 749 and the like shown in FIG. 3 are stored in the RAM 1004.

The sound generation IC 1008 and the image generation IC 1010 are also disposed in such a type of game apparatus, to generate and output game sounds and game images appropriate to the game.

The sound generation IC 1008 is an integrated circuit for generating game sounds such as sound effects, background music or the like, on the basis of data stored in the data storage medium 1006 or the ROM 1002. The game sounds generated by the sound generation IC 1008 are outputted from the speaker 1020.

The image generation IC 1010 is an integrated circuit for generating pixel data required to output the images to the display device 1018, on the basis of image data outputted from the RAM 1004, the ROM 1002, the data storage medium 1006 or the like.

The display device 1018 corresponds to the display unit 30 shown in FIG. 3.

The communication device 1024 is a device for communicating various data used by the game apparatus with an external device. When the game apparatus is connected with another game apparatus, the communication device 1024 is used for communicating predetermined data corresponding to the game program, the game program or other data with another game apparatus, through the communications line.

Various processing explained with reference to FIGS. 6 and 7, is realized by the programs for executing the processing, the data storage medium 1006 which stores the programs, the CPU 1000, the image generation IC 1010 or the sound generation IC 1018 which functions according to the program, or the like. The processing performed by the image generation IC 1010, the sound generation IC 1018 or the like, may be performed by the CPU 1000, a general DSP or the like, by means of software.

The present invention can be applied to not only the consumer game apparatus 1200 shown in FIG. 1, but also various types of apparatuses such as an arcade game apparatus, a large-sized attraction apparatus permitting a large number of players to participate in a game, a multimedia terminal or the like.

Figure 9:
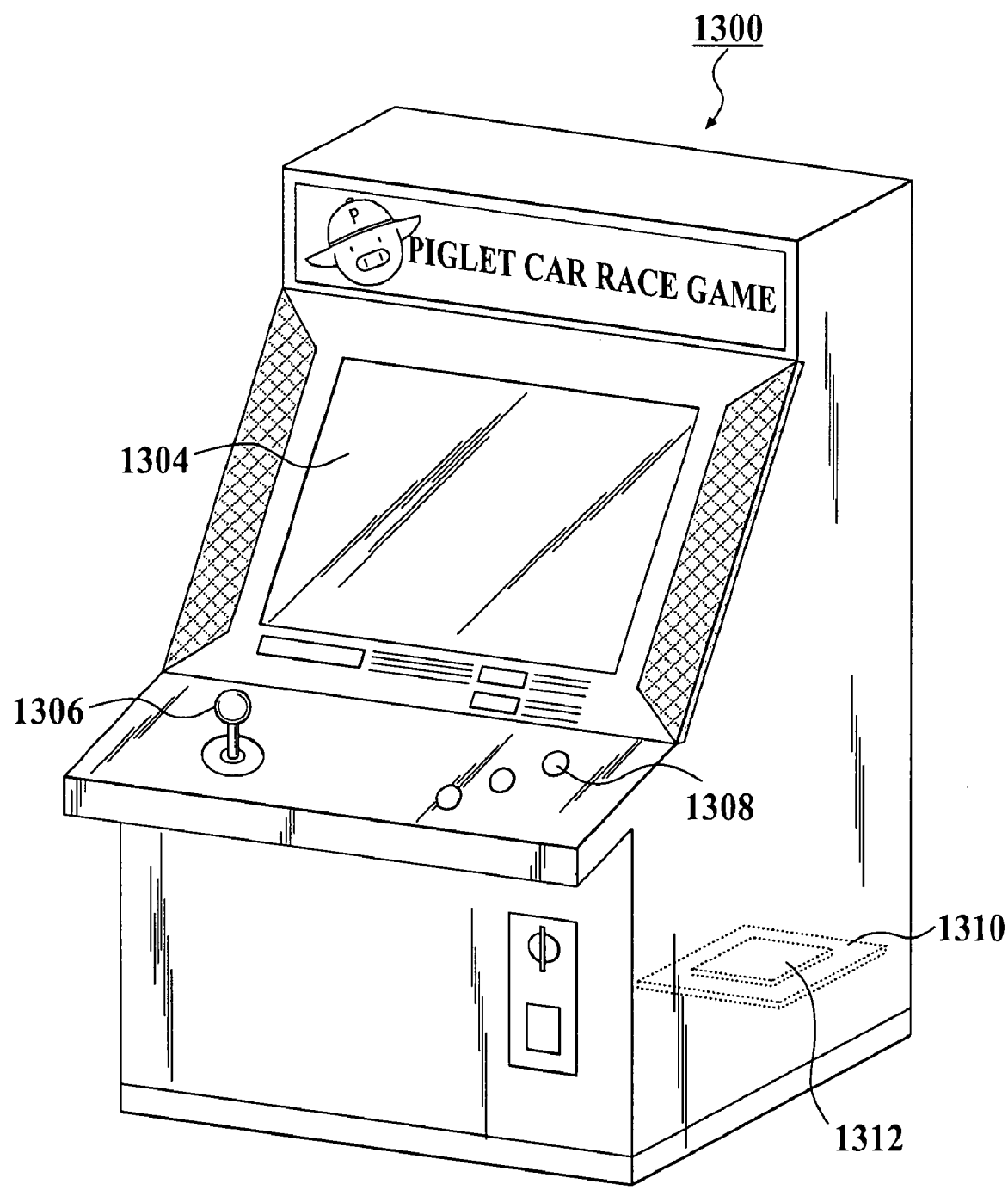
FIG. 9 is a view showing an example of a case where the present invention is applied to an arcade game apparatus 1300.

For example, FIG. 9 is a view showing an example of a case where the present invention is applied to an arcade game apparatus 1300. In the arcade game apparatus 1300, a player can enjoy playing the game by performing the handle operation to rotate a joy stick 1306, watching an image displayed on a display 1304.

Further, the CPU, the image generation IC, the sound generation IC or the like is mounted on a system board 1310 incorporated in the arcade game apparatus 1300. The game information 72 is stored in a memory 1312 as a data storage medium mounted on the system board 1310.

Figure 10A:
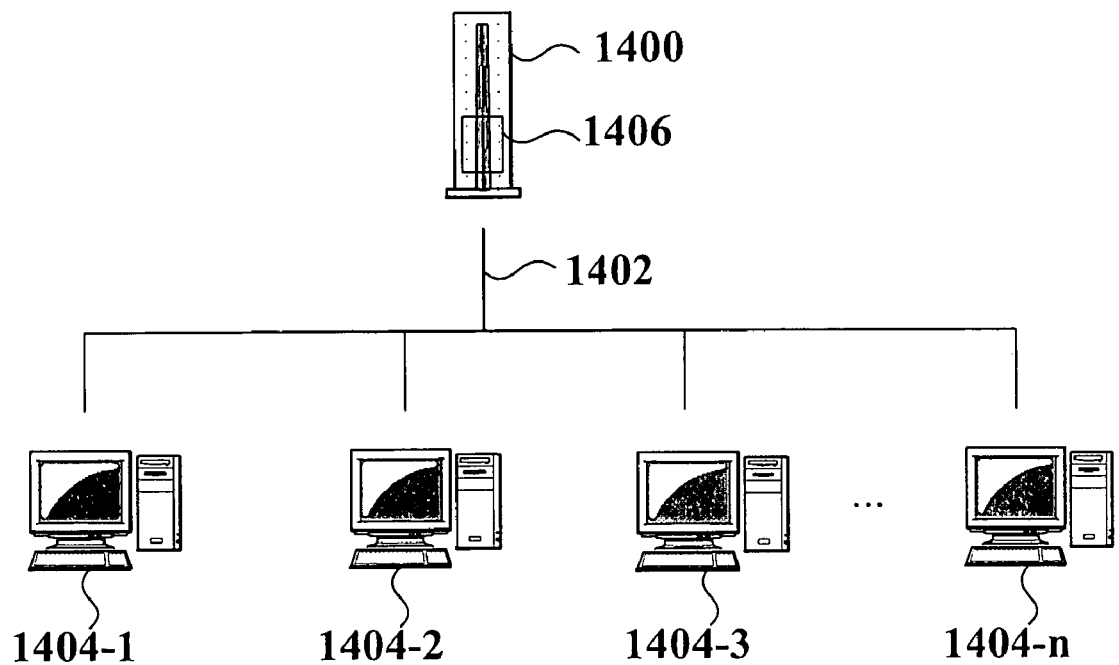
FIGS. 10A and 10B are views showing examples of cases where the present invention is applied to game systems comprising apparatuses connected through networks.
Figure 10B:
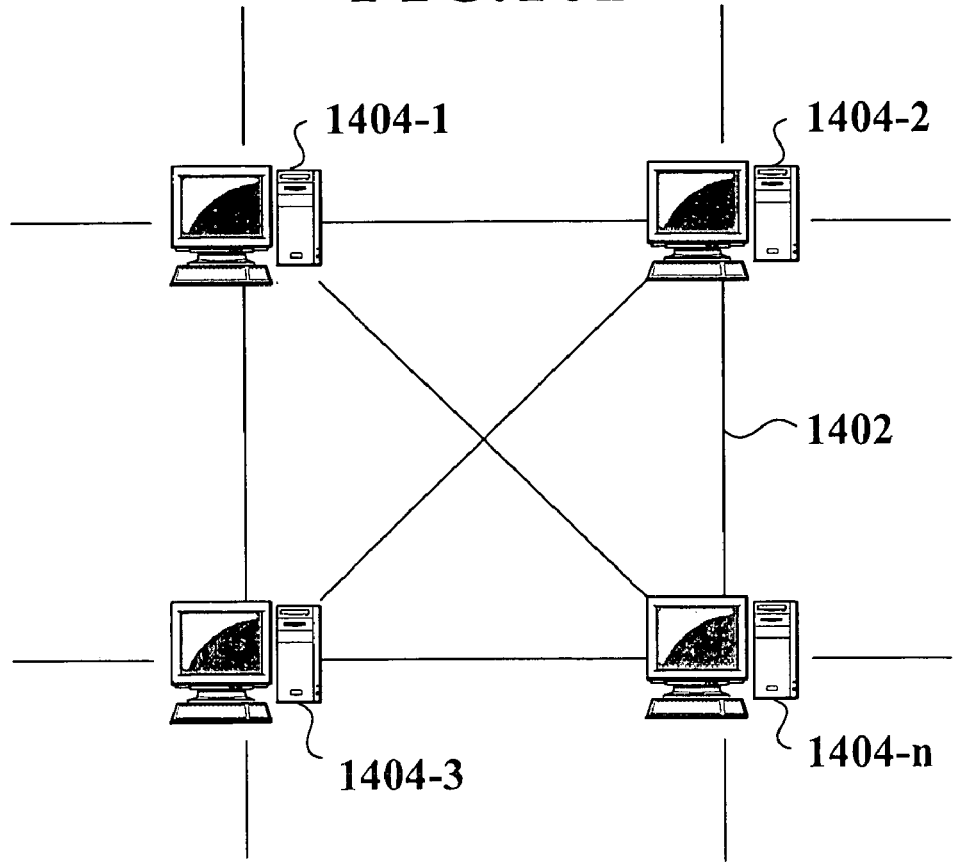

Further, FIGS. 10A and 10B are views showing examples of cases where the present invention is applied to game systems each of which includes apparatuses connected to each other through a network.

In case of the structure shown in FIG. 10A, the game system comprises a host apparatus 1400 and terminals 1401-1 to 1404-$n$ connected to the host apparatus 1400 through a communication line 1402.

In the case, the game information 72 is stored in a data storage medium 1406 such as a magnetic disc apparatus, a magnetic tape apparatus, an IC memory or the like, which can be controlled by the host apparatus 1400. In case each of the terminals 1404-1 to 1404-$n$ can generate game images and game sounds with standing alone, the host apparatus 1400 distributes game programs or the like for generating the game images and the game sounds, to the terminals 14041 to 1404-$n$. On the other hand, in case each of the terminals 1404-1 to 1404-$n$ cannot generate game images and game sounds with standing alone, the host apparatus 1400 generates game images and game sounds, and distributes them to the terminals 1404-1 to 1404-$n$. Therefore, each terminal can output the game images and the game sounds.

In case of the structure shown in FIG. 10B, there is not any apparatus corresponding to the host apparatus 1400. The terminals 1404-1 to 1404-$n$ are connected through the communication line 1402. Therefore, each means of the present invention is distributed among and executed by the terminals 1404-1 to 1404-$n$. Further, the programs or data for executing each means of the present invention may be distributed among and stored in data storage media of the terminals 1404-1 to 1404-$n$. Incidentally, the communication line 1402 means a communication path through which data can be transmitted and received. That is, the conceptual scope of the communication line 1402 include a communication network such as a telephone communication network, a cable network, the Internet or the like, besides a private line (a private cable) for a direct connection, a LAN in accordance with Ethernet (R) or the like. With regard to a communication method, both of wire communication and wireless communication may be adopted.

The terminal connected to the network, may be not only the above-described consumer game apparatus, but also a personal computer, an arcade game apparatus, a portable terminal such as a PDA or the like, or the like. In case an arcade game apparatus is connected to the network, as the terminal, the arcade game apparatus may have a structure capable of using a portable data storage device (a memory card, a portable game apparatus) which can communicate data between arcade game apparatuses and between the arcade game apparatus and the consumer game apparatus.

[Second Embodiment]

Next, a second embodiment of the present invention will be explained with reference to FIGS. 11 to 14. The second embodiment is characterized in comparison with the first embodiment in that the handle is turned according to the rotation direction and a rotation amount of the joy stick 1208, and in that the input invalid sphere is changeable. Incidentally, components similar to those of the first embodiment are designated by the same reference marks as those of the first embodiment, and the descriptions pertaining to the components are omitted.

[Explanation of Functional Block]

Figure 11:
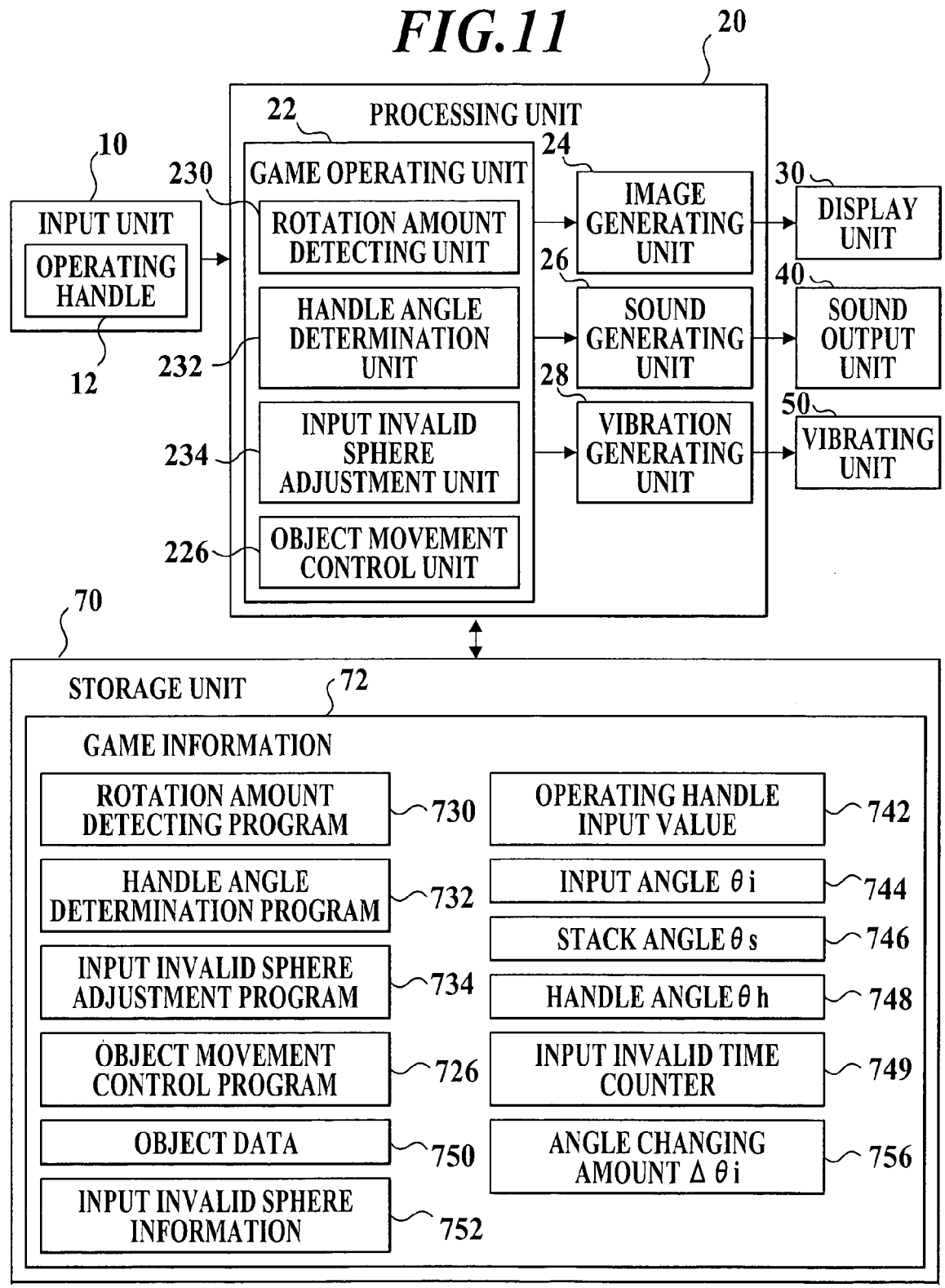
FIG. 11 is a block diagram showing an example of the functional structure according to a second embodiment.

FIG. 11 is a functional block diagram showing an example of a functional structure in the second embodiment. As shown in FIG. 11, the game apparatus 1200 comprises a rotation amount detecting unit 230, a handle angle determination unit 232 and an input invalid sphere adjustment unit 234 in the processing unit 20.

The rotation amount detecting unit 230 obtains the input angle $\theta i$ from the X-value and the Y-value included in the operation signal inputted through the joy stick 1208. Then, the rotation amount detecting unit 230 obtains the angle changing amount $\Delta\theta i$ of the joy stick 1208 from the changing amount of the input angle $\theta i$.

More specifically, the rotation amount detecting unit 230 compares the input angle $\theta i$ (744) with the stack angle $\theta s$ (746). When the signs of both the angles are the same, the rotation amount detecting unit 230 determines that the angle changing amount $\Delta\theta i$ at that time is "$\theta i - \theta s$" ($\Delta\theta i = \theta i - \theta s$). When the signs of both the angles are different from each other, and further when the input angle $\theta i$ is within the scope of $-90° < \theta i < 90°$, the rotation amount detecting unit 230 determines that the angle changing amount $\Delta\theta i$ is "$|\theta i| + |\theta s|$" ($\Delta\theta i = |i| + |\theta s|$), and that the sign of the angle changing amount $\Delta\theta i$ is the same as that of the input angle $\theta i$. When the signs of both the angles are different from each other, and when the input angle $\theta i$ is within the scopes of $-180° < \theta i \leq 90°$ and $90° \leq \theta i < 180°$, the rotation amount detecting unit 230 determines that the angle changing amount $\Delta\theta i$ is "$|\theta i| + |\theta s| - 360°$" ($\Delta\theta i = |\theta i| + |\theta s| - 360°$), and that the sign of the angle changing amount $\Delta\theta i$ is the same as that of the input angle $\theta i$.

Consequently, the rotation direction of the angle changing amount $\Delta\theta i$ is designated by its positive or negative sign. When the sign is positive, the angle changing amount $\Delta\theta i$ indicates that the joy stick 1208 is rotated clockwise. When the sign is negative, the angle changing amount $\Delta\theta i$ indicates that the joy stick 1208 is rotated counterclockwise.

The handle angle determination unit 232 determines the handle angle $\theta h$ by adding the angle changing amount $\Delta\theta i$ obtained by the rotation amount detecting unit 230 to the present handle angle $\theta h$ within the handle angle limited sphere. When the handle angle $\theta h$ exceeds the handle angle limited sphere as the result of the addition, the handle angle determination unit 232 determines the handle angle $\theta h$ to be the maximum value or the minimum value of the handle angle limited sphere similarly to the first embodiment.

The input invalid sphere adjustment unit 234 makes the storage unit 70 store history information of the input angle $\theta i$ included in the input invalid sphere A1 as an angle changing amount $\Delta\theta i$ 756 which will be described later. Then, the input invalid sphere adjustment unit 234 adjusts the determination of the input invalid sphere A1 on the basis of the angle changing amount $\Delta\theta i$ 756. Thus, the input invalid sphere adjustment unit 234 makes the consumer game apparatus 1200 matched with the operational individuality to be easier to handle. Incidentally, the present embodiment does not deal with the input invalid sphere A2.

The game information 72 of the present embodiment includes a rotation amount detecting program 730 being information for making the rotation amount detecting unit 230 of the processing unit 20 function, a handle angle determination program 732 being information for making the handle angle determination unit 232 function, and an input invalid sphere adjustment program 734 being information for making the input invalid sphere adjustment unit 234 function, as programs.

Moreover, the game information 72 includes the angle changing amount $\Delta\theta i$ (756) as data.

Figures 12A, 12B:
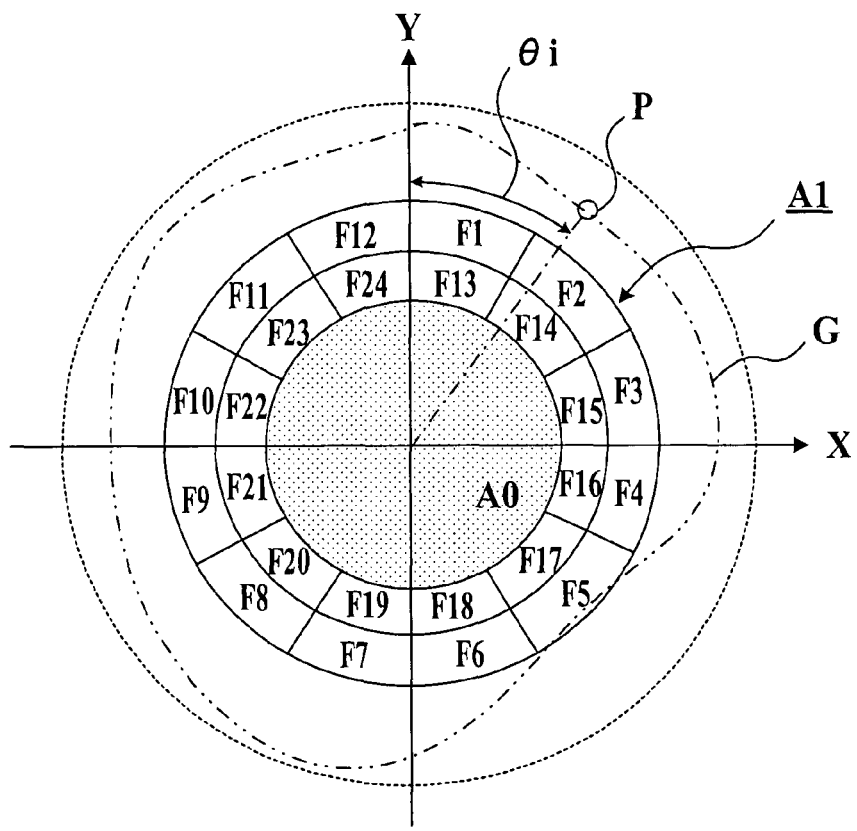
FIG. 12A is a view showing determination of an input invalid sphere A1 according to the second embodiment.
FIG. 12B is a data structure diagram showing an example of a data structure of input invalid sphere information according to the second embodiment.

FIG. 12A is a view showing determination of the input invalid sphere A1 in the second embodiment, and FIG. 12B is a data structure diagram showing an example of the data structure of the input invalid sphere information 752.

The X-axis and the Y-axis in FIG. 12A respectively exhibit coordinates of X-values and Y-values included in the operation signal inputted through the joy stick 1208.

As shown in FIG. 12A, in the second embodiment, the input invalid sphere A1 is defined as a set of a plurality of sector areas F1-Fn (n: integer) formed by concentric circles around the origin of the XY-coordinates. More specifically, a plurality of concentric circle regions are determined around a limited sphere A0 for absorbing the dispersion in the manufacturing of the joy stick 1208, and divided into the plurality of sector areas F1-Fn. Each of the sector areas F1-Fn includes information concerning validity as the input invalid sphere A1 therein.

As shown in FIG. 12B, the input invalid sphere information 752 stores an identification number 752a, sphere information 752b defining the limited sphere A0 and the sector areas F1-Fn, a determination applicable flag 752c indicating the validity of the sector areas F1-Fn as the input invalid sphere A1, and an invalid number 752d, which are related to one another.

The invalid number 752d stores the number of times the input angle $\theta i$ is included in the sector area Fn and determined to be invalid. The input invalid sphere adjustment unit 234 retrieves the sector area Fn having the high frequency that the input angle $\theta i$ is determined to be invalid with reference to the input invalid sphere information 752, and appropriately adjusts the determination of the input invalid sphere A1 in order that the sector area Fn is not be included in the input invalid sphere A1. The rotation amount detecting unit 230 determines whether the input angle $\theta i$ is included in the input invalid sphere A1 or not with reference to the determination applicable flag 752c. Incidentally, the division of the sector areas F1-Fn may be appropriately determined according to the contents of the game, objects of the player or the like.

In the example of FIG. 12A, when the input angle $\theta i$ of the joy stick 1208 is changed like a locus G, the input invalid sphere A1 can be more adapted to the operational individuality of the player by making the sector area F5 invalid as the input invalid sphere A1. Thereby, it becomes possible to realize the operation input which is always smooth.

[Descriptions of Processing Flow]

Next, a processing flow in the second embodiment will be explained with reference to FIGS. 13 and 14.

Figure 13:
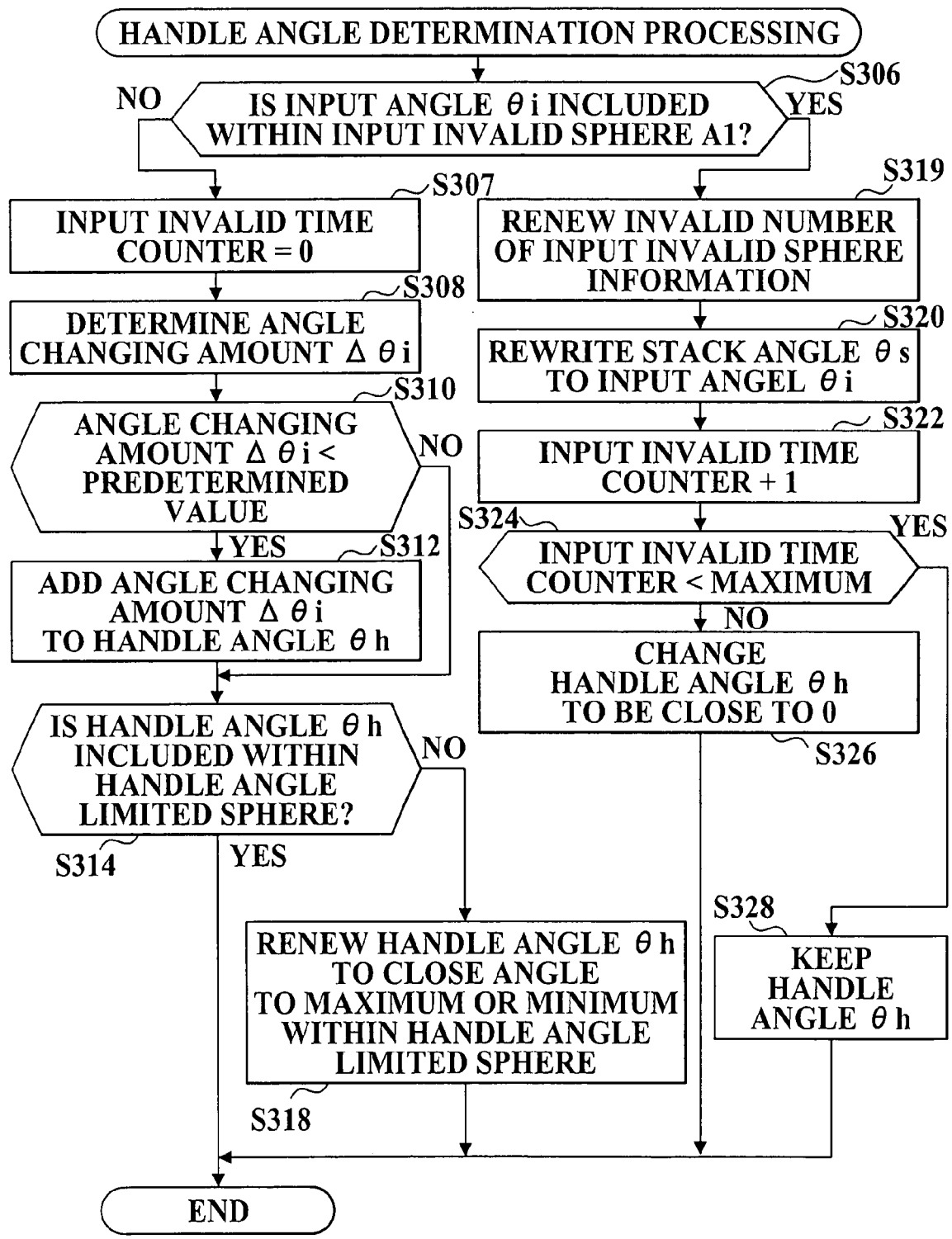
FIG. 13 is a flowchart for explaining a flow of the handle angle determination processing according to the second embodiment.

FIG. 13 is a flowchart for explaining the flow of the handle angle determination processing in the second embodiment. As shown in FIG. 13, the rotation amount detecting unit 230 determines whether the input angle $\theta i$ is included within the input invalid sphere A1 or not by reference to the input invalid sphere information 752 (Step S306).

When the input angle $\theta i$ is not included within the input invalid sphere A1 (Step S306; NO), first the rotation amount detecting unit 230 resets the input invalid time counter 749 to be "0" (Step S307). Next, the rotation amount detecting unit 230 obtains the angle changing amount $\Delta\theta i$ on the basis of the input angle $\theta i$ and the stack angle $\theta s$ (Step S308).

More specifically, the rotation amount detecting unit 230 compares the input angle $\theta i$ (744) and the stack angle $\theta s$ (746) to each other. When the signs of both the angles are the same, the angle changing amount $\Delta\theta i$ is determined in accordance with the formula: $\Delta\theta i=\theta i-\theta s$. When the signs of both the angles are different from each other, and further when the input angle $\theta i$ is within the scope of $-90°<\theta i<90°$, the angle changing amount $\Delta\theta i$ is determined in accordance with the formula: $\Delta\theta i=|\theta i|+|\theta s|$, and the sign of the angle changing amount $\Delta\theta i$ is determined to be the same as that of the input angle $\theta i$. When the signs of both the angles are different from each other, and further when the input angle $\theta i$ is within the scopes of $-180°<\theta i\leqq 90°$ and $90°<\theta i<180°$, the angle changing amount $\Delta\theta i$ is determined in accordance with the formula: $\Delta\theta i=|\theta i|+|\theta s|-360°$, and the sign of the angle changing amount $\Delta\theta i$ is determined to be the same as that of the input angle $\theta i$.

Next, when the angle changing amount $\Delta\theta i$ is equal to or more than a predetermined value (Step S310; NO), for example, when the joy stick 1208 is erroneously controlled to be moved to the extent of about 180° at a stroke, the handle angle determination unit 232 finishes the handle angle determination processing without changing the handle angle $\theta h$. Thus the erroneous input is neglected. When the angle changing amount $\Delta\theta i$ is smaller than the predetermined value (Step S310; YES), the handle angle determination unit 232 adds the angle changing amount $\Delta\theta i$ to the handle angle $\theta h$ (Step S312).

Accordingly, it is preferable that the predetermined value used in Step S310 is appropriately determined according to the time interval of execution of the object movement processing and the contents of the game. Incidentally, the handle is not turned at this stage. However, when the joy stick 1208 is successively rotated in any direction, the handle determination processing is again executed after a sufficiently short time of the extent of several milliseconds. Then, the input angle $\theta i$ at the time of the previous movement of the joy stick 1208 to the extent of about 180° is determined as the stack angle $\theta s$ at this time. Consequently, it is possible to continue operation without hindering the game plays.

Next, the handle determination unit 232 determines whether the handle angle $\theta h$ is included within the handle angle limited sphere or not (Step S314).

When the handle angle $\theta h$ is included in the handle angle limited sphere (Step S314; YES), the handle angle determination unit 232 considers that the handle is not locked yet, and finishes the handle angle determination processing.

On the other hand, when the handle angle $\theta h$ is not included in the handle angle limited sphere (Step S314; NO), the handle angle determination unit 232 considers that the handle has been reached to the locked state, and renews the handle angle $\theta h$ to a closer angle to the maximum value or the minimum of the locked state (Step S318). In case of the determination of the above-described "lock to lock 1.8 rotations", the handle angle limited sphere is determined within the scope from $-324°$ to $324°$. Thus, the handle angle $\theta h$ is renewed to be $-324°$ in case of the right locked state, or to be $324°$ in case of the left locked state.

In Step S306, when the input angle $\theta i$ is included within the input invalid sphere A1 (Step S306; YES), the input invalid sphere adjustment unit 234 first renews the invalid number 752d of the sector area Fn in which the input angle $\theta i$ is included (Step S319). Then, the rotation amount detecting unit 230 rewrites the value of the stack angle $\theta s$ to the input angle $\theta i$, and holds the input angle $\theta i$ without updating it (Step S320).

Next, the handle angle determination unit 232 increments the input invalid time counter by "1" (Step S322). When the value of the input invalid time counter after the increment exceeds the predetermined maximum value, namely when the input angle $\theta i$ is not updated equal to or longer than the predetermined time (Step S324; NO), the handle angle determination unit 232 reduces and renews the handle angle $\theta h$ at the predetermined rate to bring the handle angle $\theta h$ close to "0" (Step S326). On the other hand, when the value of the input invalid counter after the increment does not exceed the predetermined maximum value, namely when the input angle $\theta i$ is not updated for a short time yet (Step S324; YES), the handle angle determination unit 232 keeps the handle angle $\theta h$ without renewing it (Step S328). When the processing up to this step has been completed, the handle angle determination processing is finished.

Figure 14:
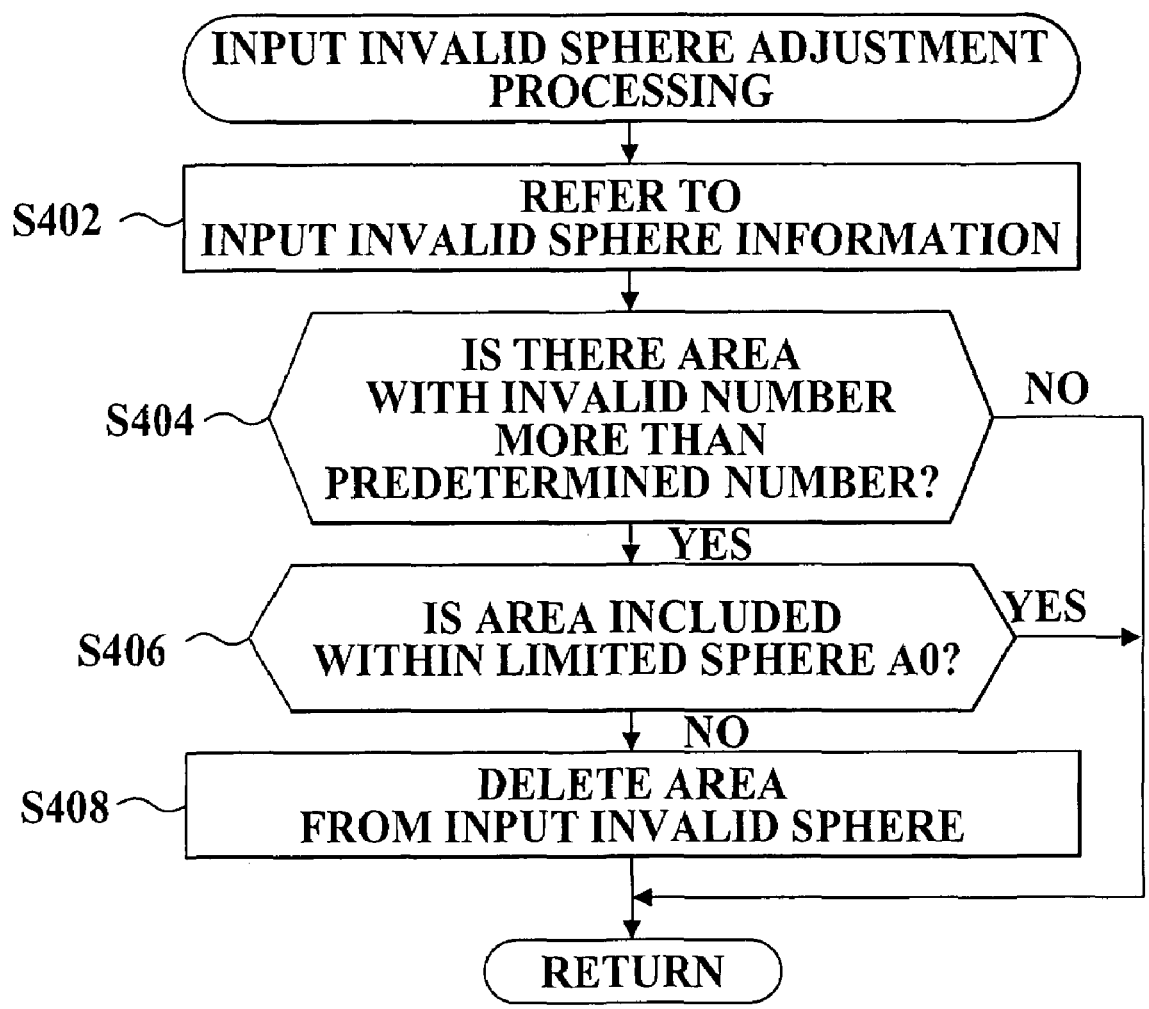
FIG. 14 is a flowchart for explaining a flow of input invalid sphere adjustment processing according to the second embodiment.

FIG. 14 is a flowchart for explaining the flow of the input invalid sphere adjustment processing in the second embodiment. The input invalid sphere adjustment processing is processing for properly adjusting the input invalid sphere A1 according to the individuality of operations of a player. For example, the input invalid sphere adjustment processing is appropriately performed before Step S306 in FIG. 13, after one race is finished, the player selects the execution of the input invalid sphere adjustment processing in the menu screen or the like, or the like.

As shown in FIG. 14, the input invalid sphere adjustment unit 234 referrers to the input invalid sphere information 752 (Step S402), and retrieves the sector area Fn in which the invalid number 752d exceeds a predetermined number (Step S404). The predetermined number is approximately determined according to the contents of the game and the execution frequency of the input invalid sphere adjustment processing.

When there is a sector area Fn in which the invalid number 752d exceeds the predetermined number (Step S404; YES), and further when the sector area Fn is not included within the limited sphere A0 (Step S406; NO), the input invalid sphere adjustment unit 234 makes the determination applicable flag of the sector area Fn to be, for example, "0" and to be out of the determination objects (Step S408).

On the other hand, when there is no sector area Fn in which the invalid number 752d exceeds the predetermined number (Step S404; NO), or when the sector area Fn in which the invalid number 752d exceeds the predetermined number is included within the limited sphere A0 (Step S406; YES), the input invalid sphere adjustment unit 234 finishes the input invalid sphere adjustment processing without changing any determination applicable flag.

According to the above-described processing, when the joy stick 1208 is rotated in either the right direction or the left direction in which the player wants to turn the handle, from an arbitrary inclination direction, the handle is turned in the rotation direction of the joy stick 1208, and the direction of the race car object R is changed. However, when the handle has passed the handle angle limited sphere, the handle is no more turned similarly in the first embodiment.

As described above, the first and the second embodiments according to the present invention have been described. However, the application of the present invention is not limited to such embodiments. Components may be added or exchanged appropriately.

Figure 15:
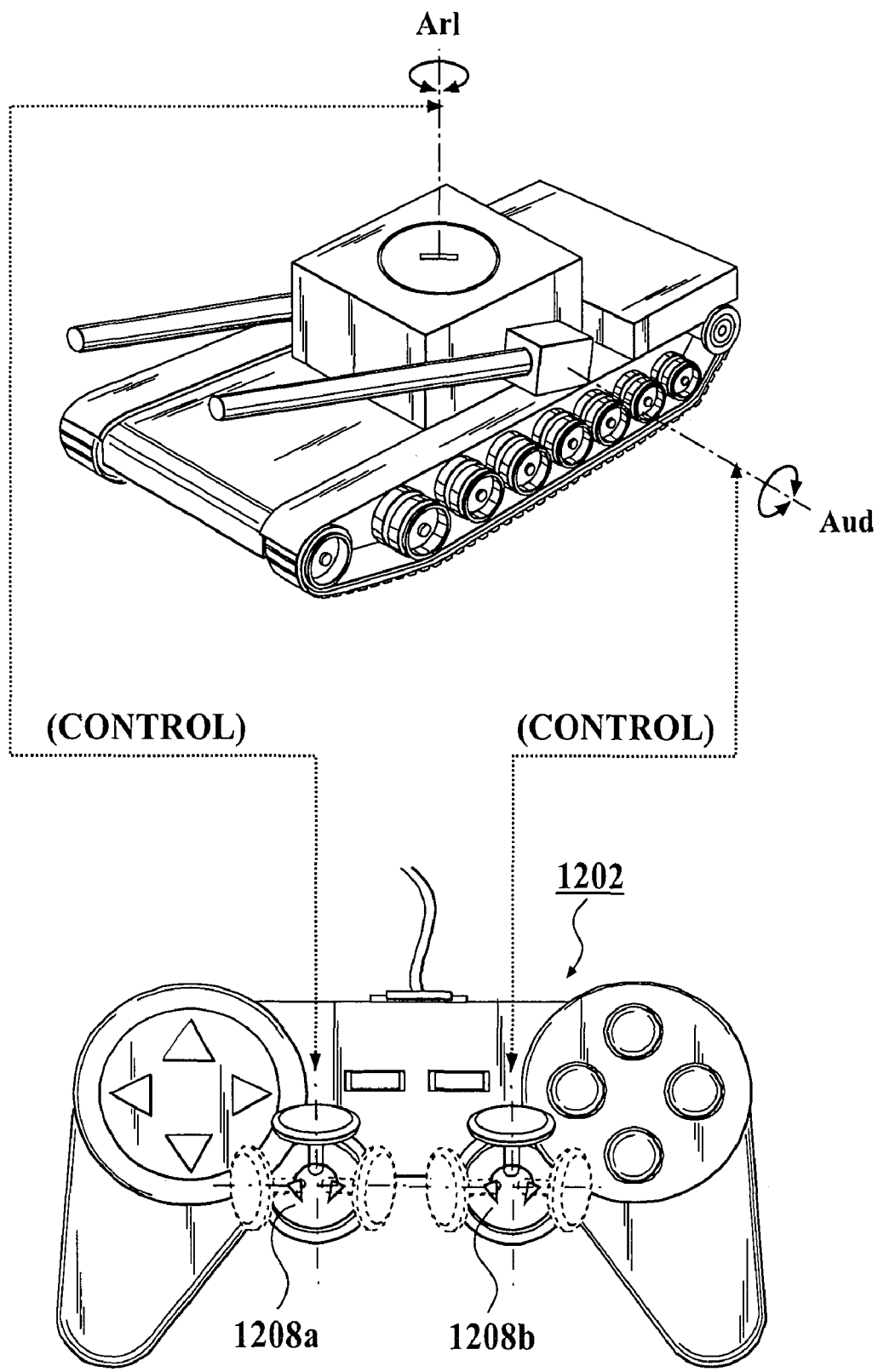
FIG. 15 is a view showing an example of a case where two joy sticks are used for inputting two operation.

For example, it has been explained that only one operation is controlled by the joy sticks 1208. However, a plurality of operation may controlled by a plurality of joy sticks 1208. For example, as shown in FIG. 15, when the object operated by the player is an antiaircraft gun, the game controller 1202 may have a structure to be provided with two joy sticks 1208a and 1208b in order that a lateral rotation axis Arl of a battery and a vertical rotation axis Aud of a barrel may be operated independently with the joy sticks 1208a and 1208b, respectively.

Figure 16:
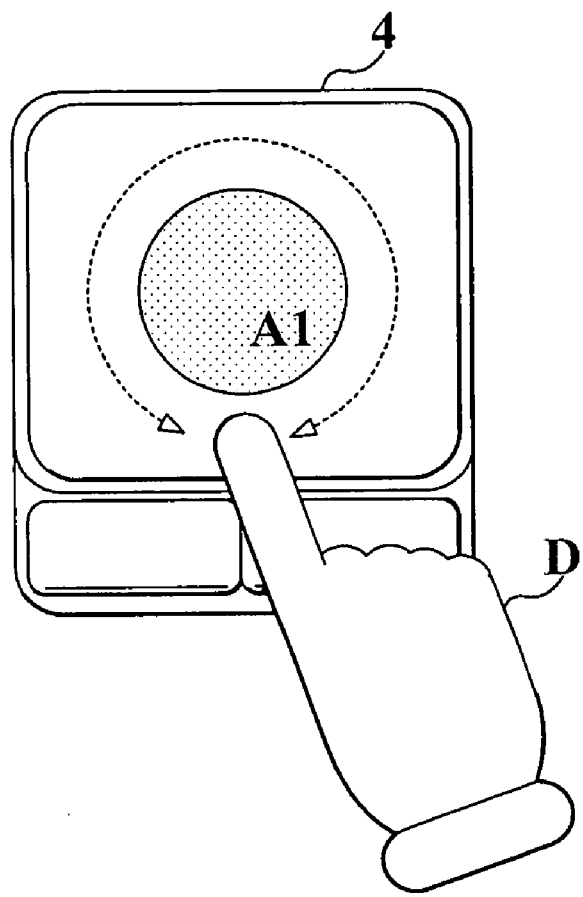
FIG. 16 is a view showing operation in case of inputting the operation by a track pad.

Further, input means is not limited to the joy stick 1208. For example, as shown in FIG. 16, a track pad 4 may be used in place of the joy stick 1208 for operation input by a finger D used in the way of drawing an arc. In this case, the input angle θi is obtained on the basis of plane coordinate values outputted from the track pad 4. The input invalid sphere A1 is appropriately determined.

Figure 17:
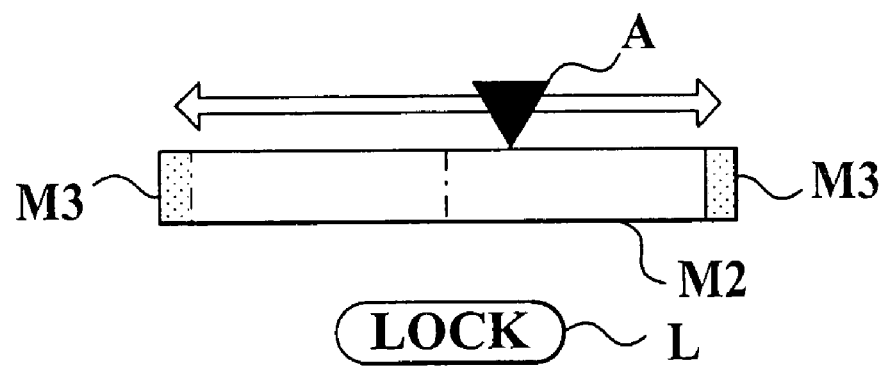
FIG. 17 is a view showing a modified example of a screen display for informing a handle lock.

Further, the display on the screen for informing the player of the handle lock is not limited to the tire mark M. For example, as shown in FIG. 17, the display may have a structure in which the turned width of the handle is exhibited by a bar M2 and the present turned position of the handle is indicated by an arrow A. Belts M3 on the both ends of the bar M2 indicate limits. The arrow A moves from side to side along the bar M2 on the basis of the handle angle θh for informing the user of the turned position.

According to the present invention, when the operating handle (joy stick) mounted on the game controller is inclined and rotated, the change in the inclined direction of the operating handle is detected. Therefore, the virtual steering wheel is rotated in the direction in which the operating handle is rotated.

Consequently, the player can operate the player character by operating the operating handle so as to incline and rotate the operating handle. In comparison with the earlier development in which the player simply inclines the operating handle linearly in the front and rear direction or in the right and left direction, it is possible to gain strokes of operation and input finer operation.

The entire disclosure of Japanese Patent Application No. Tokugan 2002-193653 filed on Jul. 2, 2002 including specification, claims, drawings and summary are incorporated herein by reference in its entirety.

What is claimed is:

1. A game performing method for an apparatus comprising an input section having an operating handle capable of inputting an inclination of a desired angle in a desired direction, the method comprising:
    controlling a virtual handle of a player character according to operation inputted through the operating handle;
    detecting an inclined direction and an inclined angle of the operating handle;
    changing a handle angle of the virtual handle in a direction according to change in the inclined direction when the change in the inclined direction is detected by detecting the inclined direction and the inclined angle of the operating handle; and
    determining whether the inclined direction and the inclined angle of the operating handle detected satisfy a predetermined condition or not, wherein the determining whether the inclined direction and the inclined angle of the operating handle detected satisfy a predetermined condition or not includes determining that the inclined direction and the inclined angle satisfy the predetermined condition when the inclined direction and the inclined angle are not changed for a predetermined time or more.

2. The game performing method as claimed in claim 1, further comprising: determining a changeable amount of the handle angle on the basis of changing amounts of the inclined direction and the inclined angle detected,
    wherein the changing a handle angle of the virtual handle includes changing the handle angle on the basis of the changeable amount determined.

3. The game performing method as claimed in claim 1, wherein the changing a handle angle of the virtual handle includes changing the handle angle when the inclined angle is not less than a threshold angle and the change in the inclined direction is detected by detecting the inclined direction and the inclined angle of the operating handle.

4. The game performing method as claimed in claim 1, wherein the operating handle is a stick-shaped one, and
    the input section holds the operating handle in an upright position at an approximately central position of a movable sphere of the operating handle in a neutral state of the operating handle.

5. The game performing method as claimed in claim 1, further comprising: changing the handle angle so as to bring the handle angle close to a predetermined angle gradually when determining that the inclined direction and the inclined angle satisfy the predetermined condition.

6. The game performing method as claimed in claim 1, further comprising: displaying a display object for expressing a present state of the handle angle.

7. The game performing method as claimed in claim 1, further comprising: moving a predetermined part of the player character according to the handle angle of the virtual handle.

8. A storage medium having information recorded thereon, when the information is loaded onto the apparatus, the information making the apparatus execute the method as claimed in claim 1.

9. A program making the apparatus execute the method as claimed in claim 1, when the program is loaded onto the apparatus.

10. A game performing method for an apparatus comprising an input section having an operating handle capable of inputting an inclination of a desired angle in a desired direction, the method comprising:
    controlling a virtual handle of a player character according to operation inputted through the operating handle;
    detecting an inclined direction and an inclined angle of the operating handle;
    changing a handle angle of the virtual handle in a direction according to change in the inclined direction when the change in the inclined direction is detected by detecting the inclined direction and the inclined angle of the operating handle, wherein the changing a handle angle of the virtual handle includes changing the handle angle when the inclined angle is not less than a threshold angle and the change in the inclined direction is detected by detecting the inclined direction and the inclined angle of the operating handle;
    storing the inclined angle as history information when the inclined angle amounts to the threshold angle by detecting the inclined direction and the inclined angle of the operating handle; and
    changing the threshold angle on the basis of the history information.

11. A game performing method for an apparatus comprising an input section having an analog operating section capable of inputting a first coordinate and a second coordinate at one operation, the method comprising:

controlling a virtual handle of a player character according to operation inputted through the analog operating section;

detecting coordinates of the first coordinate and the second coordinate inputted through the analog operating section;

changing a handle angle of the virtual handle according to change in the coordinates of the first coordinate and the second coordinate detected; and determining whether the coordinates of the first coordinate and the second coordinate detected satisfy a predetermined condition or not, wherein the determining whether the coordinates of the first coordinate and the second coordinate detected satisfy a predetermined condition or not includes determining that the coordinates satisfy the predetermined condition when the coordinates are not changed for a predetermined time or more.

12. The game performing method as claimed in claim 11, further comprising: changing the handle angle so as to bring the handle angle close to a predetermined angle gradually when determining that the coordinates satisfy the predetermined condition.

13. The game performing method as claimed in claim 11, further comprising: displaying a display object for expressing a present state of the handle angle.

14. The game performing method as claimed in claim 11, further comprising: moving a predetermined part of the player character according to the handle angle of the virtual handle.

15. A storage medium having information recorded thereon, when the information is loaded onto the apparatus, the information making the apparatus execute the method as claimed in claim 11.

16. A program making the apparatus execute the method as claimed in claim 11, when the program is loaded onto the apparatus.

17. A game apparatus comprising:
an input section having an operating handle capable of inputting an inclination of a desired angle in a desired direction;
a control section for controlling a virtual handle of a player character according to operation inputted through the operating handle;
a detecting section for detecting an inclined direction and an inclined angle of the operating handle;
a changing section for changing a handle angle of the virtual handle in a direction according to change in the inclined direction when the change in the inclined direction is detected as a result of the inclined direction and the inclined angle of the operating handle detected by the detecting section; and
a determining section for determining whether the coordinates of the first coordinate and the second coordinate detected satisfy a predetermined condition or not, wherein the determining whether the coordinates of the first coordinate and the second coordinate detected satisfy a predetermined condition or not includes determining that the coordinates satisfy the predetermined condition when the coordinates are not changed for a predetermined time or more.

18. The game apparatus as claimed in claim 17, wherein the operating handle is a stick-shaped one, and
the input section holds the operating handle in an upright position at an approximately central position of a movable sphere of the operating handle in a neutral state of the operating handle.

19. A game apparatus comprising:
an input section having an analog operating section capable of inputting a first coordinate and a second coordinate at one operation;
a control section for controlling a virtual handle of a player character according to operation inputted through the analog operating section;
a detecting section for detecting coordinates of the first coordinate and the second coordinate inputted through the analog operating section;
a changing section for changing a handle angle of the virtual handle according to change in the coordinates of the first coordinate and the second coordinate detected by the detecting section; and
a determining section for determining whether the coordinates of the first coordinate and the second coordinate detected satisfy a predetermined condition or not, wherein the determining whether the coordinates of the first coordinate and the second coordinate detected satisfy a predetermined condition or not includes determining that the coordinates satisfy the predetermined condition when the coordinates are not changed for a predetermined time or more.

* * * * *